US008565217B2

(12) United States Patent
Prakash et al.

(10) Patent No.: US 8,565,217 B2
(45) Date of Patent: Oct. 22, 2013

(54) METHODS AND APPARATUS FOR SUPPORTING TUNNELING RELATED TO WIRELESS DOWNLINK SIGNALING FLOWS

(75) Inventors: Rajat Prakash, San Diego, CA (US); Fatih Ulupinar, San Diego, CA (US); Gavin Bernard Horn, La Jolla, CA (US); Paul E. Bender, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1466 days.

(21) Appl. No.: 11/781,935

(22) Filed: Jul. 23, 2007

(65) Prior Publication Data
US 2008/0069048 A1 Mar. 20, 2008

Related U.S. Application Data

(63) Continuation-in-part of application No. 11/759,918, filed on Jun. 7, 2007, now Pat. No. 7,978,677.

(60) Provisional application No. 60/812,053, filed on Jun. 7, 2006.

(51) Int. Cl.
*H04J 3/24* (2006.01)
*H04L 12/28* (2006.01)
*H04L 12/56* (2011.01)
*H04W 40/00* (2009.01)

(52) U.S. Cl.
USPC ............ 370/351; 370/392; 370/349; 455/428

(58) Field of Classification Search
USPC .......... 370/349, 335, 331, 351, 392; 455/428
See application file for complete search history.

(56) References Cited

U.S. PATENT DOCUMENTS

| 6,556,556 | B1 | 4/2003 | Sen et al. |
| 6,778,558 | B2 | 8/2004 | Balachandran et al. |
| 6,937,573 | B2 | 8/2005 | Chan et al. |

(Continued)

FOREIGN PATENT DOCUMENTS

| JP | 2007531335 A | 11/2007 |
| RU | 2224377 | 2/2004 |

(Continued)

OTHER PUBLICATIONS

3GPP2: "Application Layer for Ultra Mobile Broadband (UMB) Air Interface Specification", Apr. 2007, 3GPP2 C.S0084-004-0 Verson 1.0, pp. 3-1-3-10.*

(Continued)

*Primary Examiner* — Opiribo Georgewill
(74) *Attorney, Agent, or Firm* — Darren M. Simon

(57) ABSTRACT

Methods and apparatus for communicating packets from a remote access node assembly by way of a serving access node assembly are described. An inter-route tunneling protocol module which interfaces with a radio link protocol module is used to recover a tunneled route protocol packet. Information to be communicated to the access terminal from the remote access node assembly by way of the serving access node assembly is subject to two levels of radio link protocol (RLP) processing operations. The first level of RLP processing being performed by the remote access node assembly. The second level of RLP processing being performed by the serving access node assembly. The access terminal, in recovering information performs the inverse of the two levels of RLP processing.

22 Claims, 19 Drawing Sheets

(56) References Cited

U.S. PATENT DOCUMENTS

| | | | |
|---|---|---|---|
| 7,050,397 | B2 | 5/2006 | Cheng et al. |
| 7,085,291 | B2 | 8/2006 | Zhang et al. |
| 7,308,260 | B2 | 12/2007 | Mandayam et al. |
| 7,484,120 | B2 | 1/2009 | Fong et al. |
| 7,586,882 | B2 | 9/2009 | Sivalingham et al. |
| 2001/0004355 | A1 | 6/2001 | Galyas et al. |
| 2002/0141370 | A1* | 10/2002 | Abrol et al. ............ 370/338 |
| 2003/0035441 | A1 | 2/2003 | Cheng et al. |
| 2005/0271014 | A1 | 12/2005 | Gillies et al. |
| 2005/0281243 | A1 | 12/2005 | Horn et al. |
| 2006/0002465 | A1 | 1/2006 | Raveendran et al. |
| 2006/0187955 | A1 | 8/2006 | Rezaiifar et al. |
| 2006/0209694 | A1 | 9/2006 | Chandhok et al. |
| 2007/0071000 | A1 | 3/2007 | Ulupinar et al. |
| 2007/0101120 | A1* | 5/2007 | Patel et al. ............ 713/151 |
| 2007/0153722 | A1 | 7/2007 | Gillies et al. |
| 2007/0165643 | A1 | 7/2007 | Mooney et al. |
| 2007/0286206 | A1 | 12/2007 | Horn et al. |
| 2008/0008111 | A1 | 1/2008 | Prakash et al. |

FOREIGN PATENT DOCUMENTS

| | | |
|---|---|---|
| RU | 2272363 | 3/2006 |
| TW | 576050 B | 2/2004 |
| TW | I239168 | 9/2005 |
| WO | 9959364 | 11/1999 |
| WO | 0028714 | 5/2000 |
| WO | WO2006007025 | 1/2006 |
| WO | WO2007143721 | 12/2007 |

OTHER PUBLICATIONS

"Project No. 3-4875-RV1-AD2, proposed addendum of a TIA Standard, High Rate Packet Data Air Interface, (if approved, to be published as TIA-856-A-2); SP-3-4875-RV1-AD2" EIA/TIA Drafts, Telecommunications Industry Association, Arlington, VA, May 5, 2006.

AIRVANA: "Commercial-Grade VoIP over 1xEV-DO Rev A" Internet Citation, Feb. 8, 2005, p. 15-16.

International Search Report—PCT/US07/070624—International Search Authority, European Patent Office—Aug. 22, 2008.

International Search Report—PCT/US2008/070873, International Searching Authority—European Patent Office, Nov. 6, 2008.

Written Opinion of the International Searching Authority, PCT/US2008/070873, European Patent Office, Nov. 6, 2008.

Taiwan Search Report—TW097128007—TIPO—Dec. 26, 2011.

* cited by examiner

METHODS AND APPARATUS FOR SUPPORTING TUNNELING RELATED TO WIRELESS DOWNLINK SIGNALING FLOWS

RELATED APPLICATIONS

The present application is a continuation-in-part of U.S. patent application Ser. No. 11/759,918, filed on Jun. 7, 2007 titled "METHODS AND APPARATUS FOR USING CONTROL VALUES TO CONTROL COMMUNICATIONS PROCESSING" and which claims the benefit of U.S. Provisional Patent Application Ser. No. 60/812,053 filed on Jun. 7, 2006, titled "A METHOD AND APPARATUS FOR USING REPROCESS BIT TO DELIVER DATA". Each of the preceding applications is hereby expressly incorporated by reference and assigned to the Assignee of the present application.

FIELD

Various embodiments are directed to methods and apparatus for communications, and more particularly to methods and apparatus related to using tunneling to communicate information.

BACKGROUND

Wireless communications systems often include a plurality of access points (APs) which may be implemented, for example, as access nodes. In addition to APs, such systems often also include other network elements in addition to access terminals, e.g., mobile or other end node devices. In many cases access terminals communicate with access points via wireless communications links while other elements in the network, e.g., APs, generally communicate with one another via non-air links, e.g., fiber, cable or wire links.

As an Access Terminal (AT) moves in a system, and/or as airlink conditions change, the access terminal may lose or terminate a connection with an AP and may establish and/or maintain a connection with another AP. As a result, an AP which had an airlink connection with an AT may end up in a situation where it has undelivered packets which are to be communicated to an AT with which it no longer has a connection. Similarly, it is possible that an AT has undelivered packets intended for an application residing at an AP with which it previously had a wireless communications link but with which it no longer has a wireless communications link.

Accordingly, in many embodiments, it may important that ATs receiving an RLP packet be able to identify the AP which was responsible for generating the RLP packets to begin with so that the packets can be processed by a corresponding RLP module and the higher level packet, in the case of fragmentation, reconstructed therefrom.

It should be appreciated that there is a need for methods and/or apparatus which support the communications of packets between an AP which is remote to an AT and an AP which is serving the AT and has an active airlink connection with the AT that can be used to deliver packets or previously undelivered portions of packets. There is also a need for methods and/or apparatus which can be used to communicate sufficient control information to allow an AT to apply the proper processing, e.g., RLP processing, to packets received over an airlink.

SUMMARY

Methods and apparatus for communicating packets from a remote access node assembly by way of a serving access node assembly are described. An inter-route tunneling protocol module which interfaces with a radio link protocol module is used to recover a tunneled route protocol packet. Information to be communicated to the access terminal from the remote access node assembly by way of the serving access node assembly is subject to two levels of radio link protocol (RLP) processing operations. The first level of RLP processing being performed by the remote access node assembly. The second level of RLP processing being performed by the serving access node assembly. The access terminal, in recovering information performs the inverse of the two levels of RLP processing.

An exemplary method of operating a first access node assembly in accordance with various embodiments comprises: generating a stream protocol packet including a stream protocol packet header including a value identifying a radio link protocol packet to be communicated to an access terminal, in a payload of said stream protocol packet, as one of a tunneled radio link protocol packet and a non-tunneled packet; and communicating the generated packet over an air interface to said access terminal. An exemplary first access node assembly, in accordance with various embodiments, comprises: a stream protocol packet generation module for generating a stream protocol packet including a stream protocol packet header including a value identifying a radio link protocol packet to be communicated to an access terminal, in a payload of said stream protocol packet, as one of a tunneled radio link protocol packet and a non-tunneled packet; and a wireless transmitter module for transmitting signals conveying the generated packet over an air interface to said access terminal.

An exemplary method of operating an access terminal in accordance with various embodiments comprises: receiving a packet from an air interface; determining from a stream protocol packet header included in the received packet whether to route a radio link protocol packet included in the received packet to one of a radio link protocol module corresponding to an application and a radio link protocol module corresponding to an inter-route tunneling protocol module; and communicating the radio link protocol packet to the determined radio link protocol module. An exemplary access terminal in accordance with various embodiments comprising: a wireless receiver for receiving signals communicating a packet from an air interface; and a first stream protocol module including a first stream header evaluation module for determining from a stream protocol packet header included in a stream protocol packet communicated over the air interface, whether to route a radio link protocol packet included in the communicated stream protocol packet to one of a radio link protocol module corresponding to an application and a radio link protocol module corresponding to an inter-route tunneling protocol module.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE DRAWINGS

FIG. 4 illustrates an exemplary network including a centralized AN architecture and an AT.

DETAILED DESCRIPTION

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Figure 1:
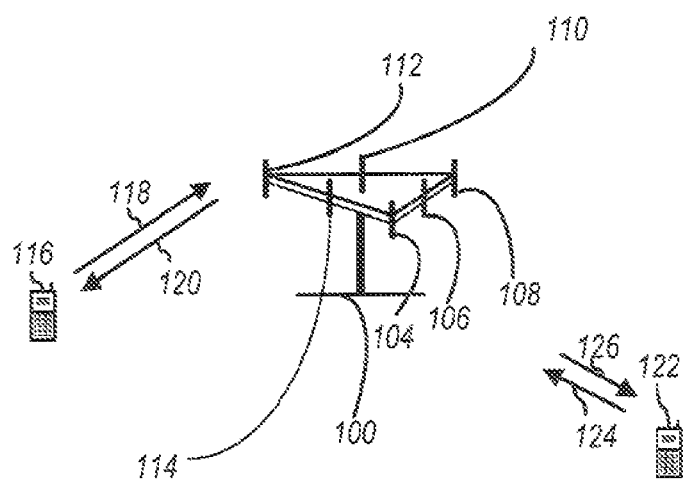
FIG. 1 illustrates a multiple access wireless communication system according to one embodiment.

Referring to FIG. 1, a multiple access wireless communication system according to one embodiment is illustrated. An access point 100 (AP) includes multiple antenna groups, one including 104 and 106, another including antennas 108 and 110, and an additional antenna group including antennas 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequencies for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access node, a Node B, a base station or some other terminology. An access terminal may also be called an access device, user equipment (UE), a wireless communication device, terminal, wireless terminal, mobile terminal, mobile node, end node or some other terminology.

Figure 2:
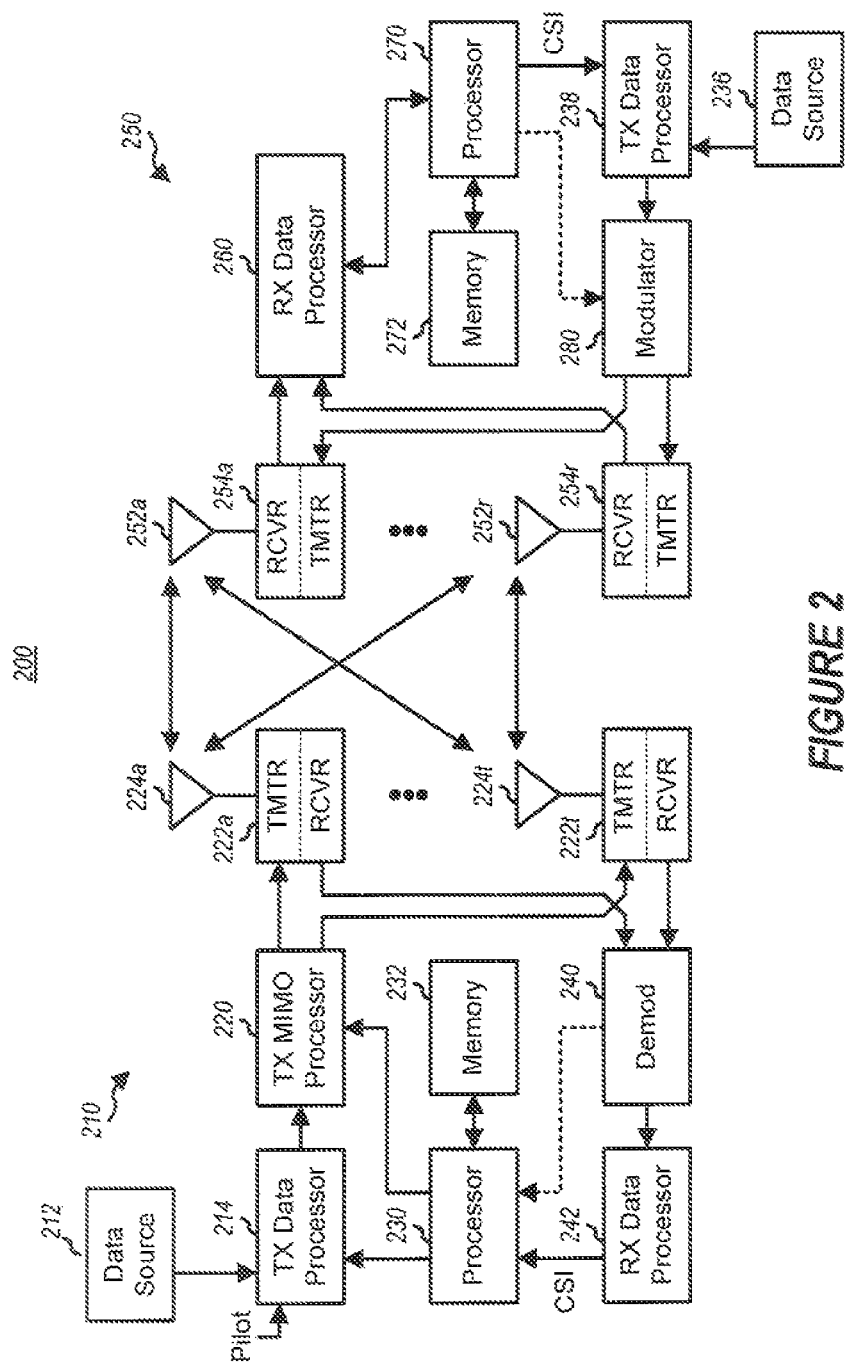
FIG. 2 is a block diagram of an exemplary communication system.

FIG. 2 is a block diagram of an embodiment of an exemplary access point 210 and an exemplary access terminal 250 in a MIMO system 200. At the access point 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for each of the data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter (222a, . . . , 222t) receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver (254a, . . . , 254r) conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers (254a, . . . , 254r) based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted, via antennas (252a, 252r), respectively, back to access point 210.

At access point 210, the modulated signals from access terminal 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights, then processes the extracted message.

Memory 232 includes routines and data/information. Processors 230, 220 and/or 242 execute the routines and use the data/information in memory 232 to control the operation of the access point 210 and implement methods. Memory 272 includes routines and data/information. Processors 270, 260, and/or 238 execute the routines and uses the data/information in memory 272 to control the operation of the access terminal 250 and implement methods.

In an aspect, SimpleRAN is designed to significantly simplify the communications protocols between the backhaul access network elements in a wireless radio access network, while providing fast handoff to accommodate the demands of low latency applications, such as VOIP, in fast changing radio conditions.

In an aspect, the network comprises access terminals (AT) and an access network (AN).

The AN supports both a centralized and distributed deployment. The network architectures for the centralized and distributed deployments are shown in FIG. 3 and FIG. 4 respectively.

Figure 3:
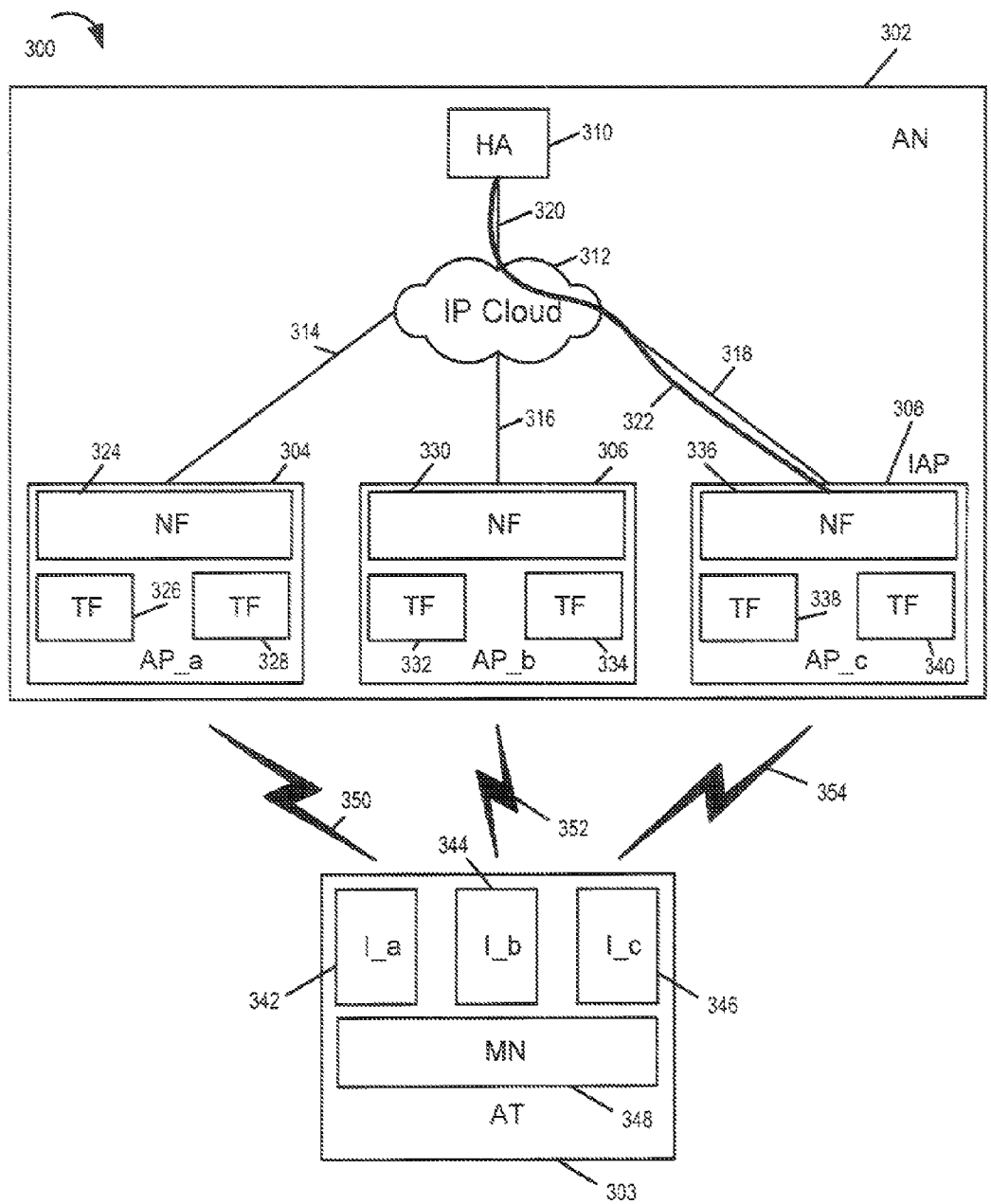
FIG. 3 illustrates an exemplary network including a distributed access network (AN) architecture and an access terminal (AT).
Figure 4:
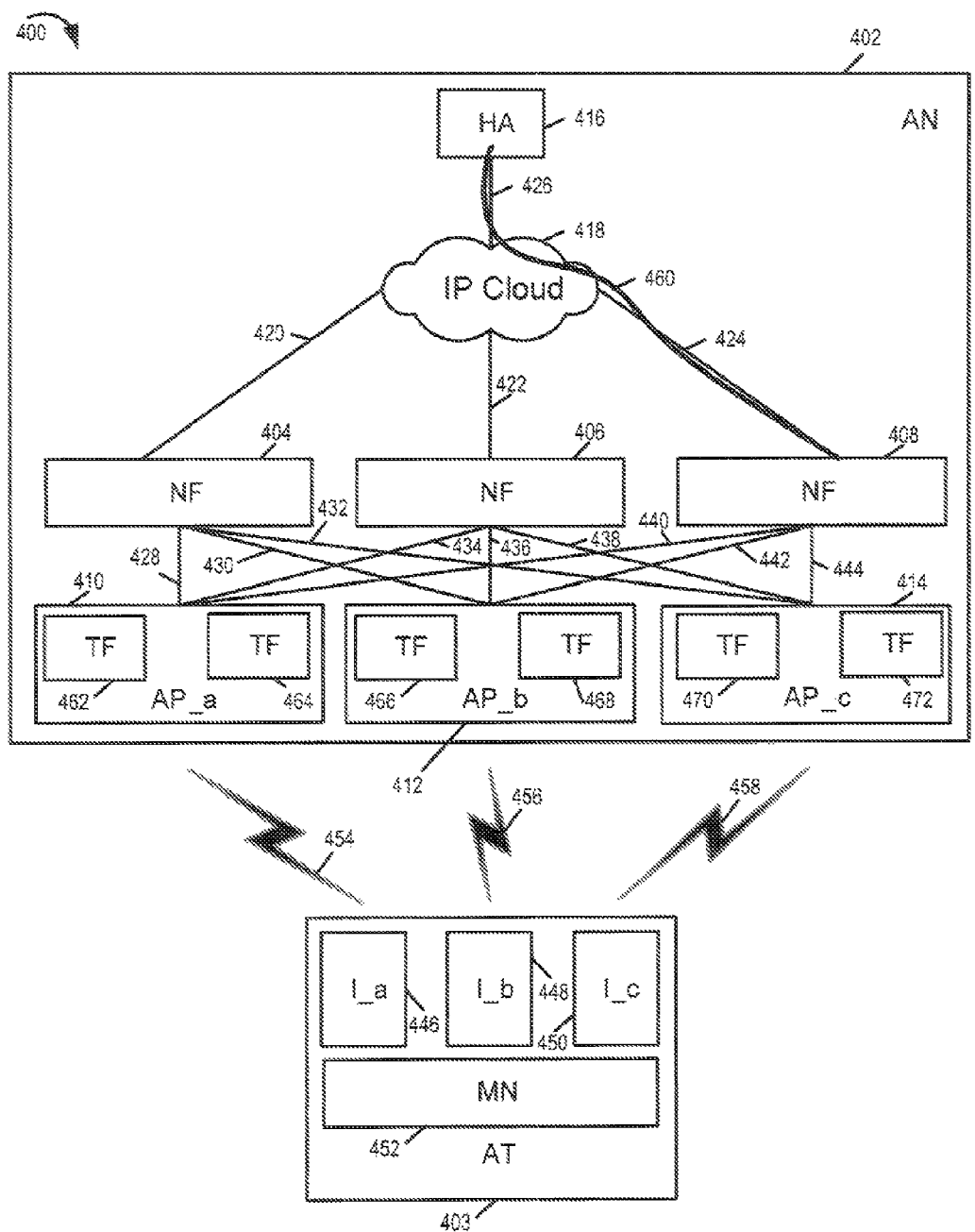

FIG. 3 illustrates an exemplary network 300 including a distributed AN 302 and an AT 303.

In a distributed architecture shown in FIG. 3, the AN 302 comprises access points (AP) and home agents (HA). AN 302 includes a plurality of access points (APa 304, APb 306, APc 308) and home agent 310. In addition, AN 302 includes an IP cloud 312. The APs (304, 306, 308) are coupled to the IP cloud via links (314, 316, 318), respectively. The IP cloud 312 is coupled to the HA 310 via link 320.

An AP includes a:

Network function (NF):

One per AP, and multiple NFs can serve a single AT.

A single NF is the IP layer attachment point (IAP) for each AT, i.e., the NF to which the HA forwards packets sent to the AT. In the example of FIG. 4, NF 336 is the current IAP for AT 303, as shown by the line 322 in FIG. 4.

The IAP may change (L3 handoff) to optimize routing of packets over the backhaul to the AT.

The IAP also performs the function of the session master for the AT. (In some embodiments, only the session master can perform session configuration, or change the session state.)

The NF acts as the controller for each of the TFs in the AP and performs functions like allocating, managing and tearing down resources for an AT at the TF.

Transceiver functions (TF) or sector:

Multiple per AP, and multiple TFs can serve a single AT.

Provides the air interface attachment for the AT.

Can be different for the forward and reverse links.

Changes (L2 handoff) based on radio conditions.

In AN 302 APa 304 includes NF 324, TF 326 and TF 328. In AN 302 APb 306 includes NF 330, TF 332 and TF 334. In AN 302 APc 308 includes NF 336, TF 338 and TF 340.

An AT includes a:

Interface I_x presented to the mobile node (MN) for each NF in the active set.

Mobile node (MN) to support IP layer mobility at the access terminal.

APs communicate using a tunneling protocol defined over IP. The tunnel is an IP-in-IP tunnel for the data plane and an L2TP tunnel for the control plane.

Exemplary AT 303 includes a plurality of Interfaces (I_a 342, I_b 344, I_c 346) and MN 348. AT 303 can be, and sometimes is, coupled to AP_a 304 via wireless link 350. AT 303 can be, and sometimes is, coupled to AP_b 306 via wireless link 352. AT 303, can be, and sometimes is, coupled to AP_c 308 via wireless link 354.

FIG. 4 illustrates an exemplary network 400 including a distributed AN 402 and an AT 403.

In a centralized architecture shown in FIG. 4, the NF is no longer logically associated with a single TF, so the AN comprises network functions, access points and home agents. Exemplary AN 402 includes a plurality of NFs (404, 406, 408), a plurality of APs (AP_a 410, AP_b 412, AP_c 414), HA 416 and IP cloud 418. NF 404 is coupled to IP cloud 418 via link 420. NF 406 is coupled to IP cloud 418 via link 422. NF 408 is coupled to IP cloud 418 via link 424. IP cloud 418 is coupled to HA 416 via link 426. NF 404 is coupled to (AP_a 410, AP_b 412, AP_c 414) via links (428, 430, 432), respectively. NF 406 is coupled to (AP_a 410, AP_b 412, AP_c 414) via links (434, 436, 438), respectively. NF 408 is coupled to (AP_a 410, AP_b 412, AP_c 414) via links (440, 442, 444), respectively.

AP_a 410 includes TF 462 and TF 464. AP_b 412 includes TF 466 and TF 468. AP_c 414 includes TF 470 and TF 472.

Since an NF acts as the controller for a TF, and many NFs can be logically associated with a single TF, the NF controller for an AT, i.e., the NF communicating with an AT as a part of the active set, performs the functions of allocating, managing and tearing down resources for the TF at that AT. Therefore, multiple NFs may control resources at a single TF, although these resources are managed independently. In the example of FIG. 4, NF 408 is acting as an IAP for AT 403, as shown by the line 460.

The rest of the logical functions performed are the same as for the distributed architecture.

Exemplary AT 403 includes a plurality of Interfaces (I_a 446, I_b 448, I_c 450) and MN 452. AT 403 can be, and sometimes is, coupled to AP_a 410 via wireless link 454. AT 403 can be, and sometimes is, coupled to AP_b 412 via wireless link 456. AT 403 can be, and sometimes is, coupled to AP_c 414 via wireless link 458.

In systems like DO and 802.20, an AT obtains service from an AP by making an access attempt on an access channel of a particular sector (TF). The NF associated with the TF receiving the access attempt contacts the IAP that is the session master for the AT and retrieves a copy of the AT's session. (The AT indicates the identity of the IAP by including an UATI in the access payload. The UATI may be used as an IP address to directly address the IAP, or may be used to look up the address of the IAP.) On a successful access attempt, the AT is assigned air interface resources such as a MAC ID and data channels to communicate with that sector.

Additionally, the AT may send a report indicating the other sectors it can hear and their signal strengths. The TF receives the report and forwards it to a network based controller in the NF which in turn provides the AT with an active set. For DO and 802.20 as they are implemented today, there is exactly one NF that the AT can communicate with (except during an NF handoff when there are temporarily two). Each of the TFs in communication with the AT will forward the received data and signaling to this single NF. This NF also acts as a network-based controller for the AT and is responsible for negotiating and managing the allocation and tear down of resources for the AT to use with the sectors in the active set.

The active set is therefore the set of sectors in which the AT is assigned air interface resources. The AT will continue to send periodic reports and the network based controller may add or remove sectors from the active set as the AT moves around in the network.

NFs in the active set will also fetch a local copy of the session for the AT when they join the active set. The session is needed to communicate properly with the AT.

For a CDMA air link with soft handoff, on the uplink each of the sectors in the active set may try to decode an AT's transmission. On the downlink, each of the sectors in the active set may transmit to the AT simultaneously, and the AT combines the received transmissions to decode the packet.

For an OFDMA system, or a system without soft handoff, a function of the active set is to allow the AT to switch quickly between sectors in the active set and maintain service without having to make a new access attempt. An access attempt is generally much slower than a switch between members of the active set, since the active set member already has the session and the air interface resources assigned to the AT. Therefore, an active set is useful to do handoff without affecting the QoS service of active applications.

When, an AT and the session master in the IAP negotiate attributes, or alternatively the state of the connection changes, the new values for the attributes or the new state need to be distributed to each of the sectors in the active set in a timely manner to ensure optimal service from each sector. In some cases, for example if the type of headers changes, or security keys change, an AT may not be able to communicate at all with a sector until these changes are propagated to that sector. Thus every member of the active set should be updated when the session changes. Some changes may be less critical to synchronize than others.

There are three main types of state or context found in the network for an AT that has an active connection:

Data state is the state in the network on the data path between the AT and the IAP or an NF during a connection. Data state includes things such as header compressor state or RLP flow states which are very dynamic and difficult to transfer.

Session state is the state in the network on the control path between the AT and the IAP that is preserved when a connection is closed. Session state includes the value of the attributes that are negotiated between the AT and the IAP. These attributes affect the characteristics of the connection and the service received by the AT. For example, an AT may negotiate the QoS configuration for a new application and supply new filter and flow specifications to the network indicating the QoS service requirements for the application. As another example the AT may negotiate the size and type of the headers used in communication with the AN. The negotiation of a new set of attributes is defined as a session change.

Connection state is the state in the network on the control path between the AT and the IAP or an NF that is not preserved when a connection closes and the AT is idle. Connection state may include such information as power control loop values, soft handoff timing, and active set information.

In an IAP or L3 handoff the three types of state may need to be transferred between the old IAP and the new IAP. If only an idle AT can make an L3 handoff, then only the session state needs to be transferred. To support L3 handoff for an active AT, the data and connection state may also need to be transferred.

Systems like DO and 802.20, make L3 handoff of the data state simple by defining multiple routes (or data stacks), where the data state for each route is local to that route, i.e., the routes each have independent data state. By associating each IAP with a different route, the data state does not need to be transferred in a handoff. A further, even better step, is to associate each NF with a different route in which case L3 handoff is completely transparent to the data state, except for possible packet reordering.

Since the data state has multiple routes, the next logical step to support L3 handoff for an active AT is to move the control of the connection state from the IAP and make it local to each NF in the active set. This is done by defining multiple control routes (or control stacks) and defining the air interface so that the control stacks are independent and local to each NF. This may require that some of the negotiating and managing the allocation and tear down of resources of the connection state is transferred to the AT since there is no longer a single NF to manage all the members of the active set. It may also make some additional requirements on the air interface design to avoid a tight coupling between TFs—since different TFs may not share the same NF—in the active set. For instance, to operate in an optimal way, it is preferable to eliminate all tight synchronization between TFs that do not have the same NF, such as power control loops, soft handoff, etc.

Pushing the data and connection state down to the NFs eliminates the need to transfer this state on a L3 handoff, and also should make the NF-to-NF interface simpler.

The system therefore defines multiple independent data and control stacks (called interfaces in FIG. 3 and FIG. 4), in the AT to communicate with different NFs as needed, as well as the addressing mechanisms for the AT and TFs to logically distinguish between these stacks.

Fundamentally, some session state (QoS profile, security keys, attribute values, etc.) cannot be made local to an NF (or IAP) because it is too expensive to negotiate every time there is a NF (or a L3) handoff. Also the session state is relatively static and easy to transfer. What is needed are mechanisms to manage and update the session state as it changes and during IAP handoff where the session master moves.

Optimizing the session state transfer for L3 handoff is a useful feature regardless of the network architecture since it simplifies network interfaces and should also improve the seamlessness of handoff.

A separate but related issue is the AT control of L3 handoff. Today, in systems like DO and 802.20, the AT is aware of the L3 handoff since it allocates and tears down local stacks, but it has no control of when L3 handoff occurs. This is called network-based mobility management. The question is whether to make AT the handoff controller, i.e., to use AT based mobility management?

To support fault tolerance and load balancing, the network needs either to be able to make the handoff or have a mechanism to signal to the AT to do a handoff. Thus if AT based mobility management is used, the network still needs a mechanism to indicate when it should occur.

AT based mobility management has some obvious advantages, such as allowing for a single mechanism for inter and intra technology, or global and local mobility. It also simplifies the network interfaces further by not requiring the network elements to determine when to do handoff.

The primary reason systems like DO and 802.20 use network based mobility is that AT based mobility is not optimized to work fast enough to support voice. A secondary reason is the tunneling overhead introduced by terminating the mobile IP tunnels (for MIPv6) in the AT. The mobility latency can be solved by forwarding data using tunnels between the current and previous forward link serving sector, as well as possibly using bicasting, where the data is sent to multiple NFs in the active set simultaneously.

In SimpleRAN, there are two types of handoff:

Layer 2 or L2 handoff refers to changing of the forward link or reverse link serving sector (TF).

L3 handoff refers to changing of the IAP,

L2 handoff should be as fast as possible in response to changing radio conditions. Systems like DO and 802.20 use PHY layer signaling to make L2 handoff fast.

L2 handoff is transfer of the serving sector TF for the forward (FL) or reverse (RL) links. A handoff occurs when the AT selects a new serving sector in the active set based on the RF conditions seen at the AT for that sector. The AT performs filtered measurements on the RF conditions for the forward and reverse links for all sectors in the active set. For instance, in 802.20 for the forward link the AT can measure the SINR on the acquisition pilots, the common pilot channel (if present), and the pilots on the shared signaling channel, to select its desired FL serving sector. For the reverse link, the AT estimates the CQI erasure rate for each sector in the active set based on the up/down power control commands to the AT from the sector.

L2 handoff is initiated when the AT requests a different FL or RL serving sector via a reverse link control channel. Dedicated resources are assigned at a TF when it is included in the active set for an AT. The TF is already configured to support the AT before the handoff request. The target serving sector detects the handoff request and completes the handoff with the assignment of traffic resources to the AT. The forward link TF handoff requires a round trip of messaging between the source TF or IAP and target TF in order to receive data for the target TF to transmit. For reverse link TF handoff, the target TF may immediately assign resources to the AT.

L3 handoff is the transfer of the IAP. L3 handoff involves a HA binding update with the new IAP and requires a session transfer to the new IAP for the control-plane. L3 handoff is asynchronous to L2 handoff in the system so that L2 handoff is not limited by MIPv6 handoff signaling speed.

L3 handoff is supported over the air in the system by defining an independent route to each NF. Each flow provides multiple routes for transmission and reception of higher layer packets. The route indicates which NF processed the packet. For example, one NF may be associated at the TF and over the air as Route A, while another NF may be associated with Route B. A serving TF can simultaneously send packets to an AT from both Route A and Route B. i.e., from both NFs, using a separate and independent sequence space for each.

There are two key ideas in the system design to ensure the QoS treatment for a mobile and its traffic is retained over each handoff mode:

Decoupling of L2 and L3 handoff

Reserving air interface resources and fetching the session at the target NF or TF before the handoff occurs to minimize the data flow interruption during the handoff. This is done by adding the target TF and NF to the active set.

The system is designed to separate L2 and L3 handoff in order to allow the system to support EF traffic during high rates of L2 handoff. L3 handoff requires a binding update, which is limited to a rate of 2 to 3 per second. In order to allow a faster L2 handoff rate of 20 to 30 Hz, L2 and L3 handoff are designed to be independent and asynchronous.

For L2 handoff, the active set management allows all the TFs in the active set to be configured and dedicated resources assigned in order to be ready to serve the AT in the event of an L2 handoff.

Consider a Mobile Wireless Communication System with multiple access points (AP) that provide service to access terminals (AT). Many systems have an active set, which is a set of APs that have assigned resources to the AT. At a given point in time, an AT may be within range of radio communication with one of the APs, or for the purpose of battery power optimization and radio interference reduction, may communicate only with one carefully selected AP (serving AP). The problem considered here is the delivery of signaling messages or data packets from a non-serving AP through a serving AP.

Radio Link Protocol (RLP): Each AP has an RLP, that fragments upper layer packets, and if needed retransmits the fragments. The RLP also adds its own header to each transmitted fragment. The AT has multiple instances of RLP, one for each AP that is in the active set.

Tunneling: A serving-AP receives packets from a non-serving AP via an inter-AP tunnel called the L2TP (layer 2 tunneling protocol) tunnel. The serving AP may deliver packets received on the tunnel.

Exemplary Inter-Route Tunneling Protocol, in some embodiments is used for the tunneling of data belonging to different Routes. The Inter-Route Tunneling Protocol Header indicates the Route to which the payload belongs. The Inter-Route Tunneling Protocol allows one Route to carry payload bound for another Route, including payload bound for its Route.

A Route, in some embodiments comprises an In Use protocol stack associated with an access node assembly In one example, at the transmitter, the Inter-Route Tunneling Protocol receives packets for transmission from the Route Protocol of another Route or from the Route Protocol of the same Route. The Inter-Route Tunneling Protocol adds an Inter-Route Tunneling Protocol Header to the received packet to identify the destination Route and delivers this packet to the Radio Link Protocol. For example, consider the operations of Inter-Route Tunneling Protocol module B 532 of access terminal 506 of FIG. 5, or consider the operations of Inter-Route Tunneling Protocol module B 652 of access node assembly B 608 of FIG. 6.

At the receiver, the Inter-Route Tunneling Protocol receives packets from the Radio Link Protocol. The Inter-Route Tunneling Protocol removes the Inter-Route Tunneling Protocol Header and delivers the packet to the Route Protocol of the corresponding Route. For example, consider the operations of inter-route tunneling protocol module B 556 of access node assembly B 508 of FIG. 5 or the operations of inter-route tunneling protocol module B 630 of access terminal 606 of FIG. 6.

Inter-Route Tunneling Protocol may, and sometimes does, receive packets from the Route Protocol of its Route for further fragmentation at RLP.

Figure 8:
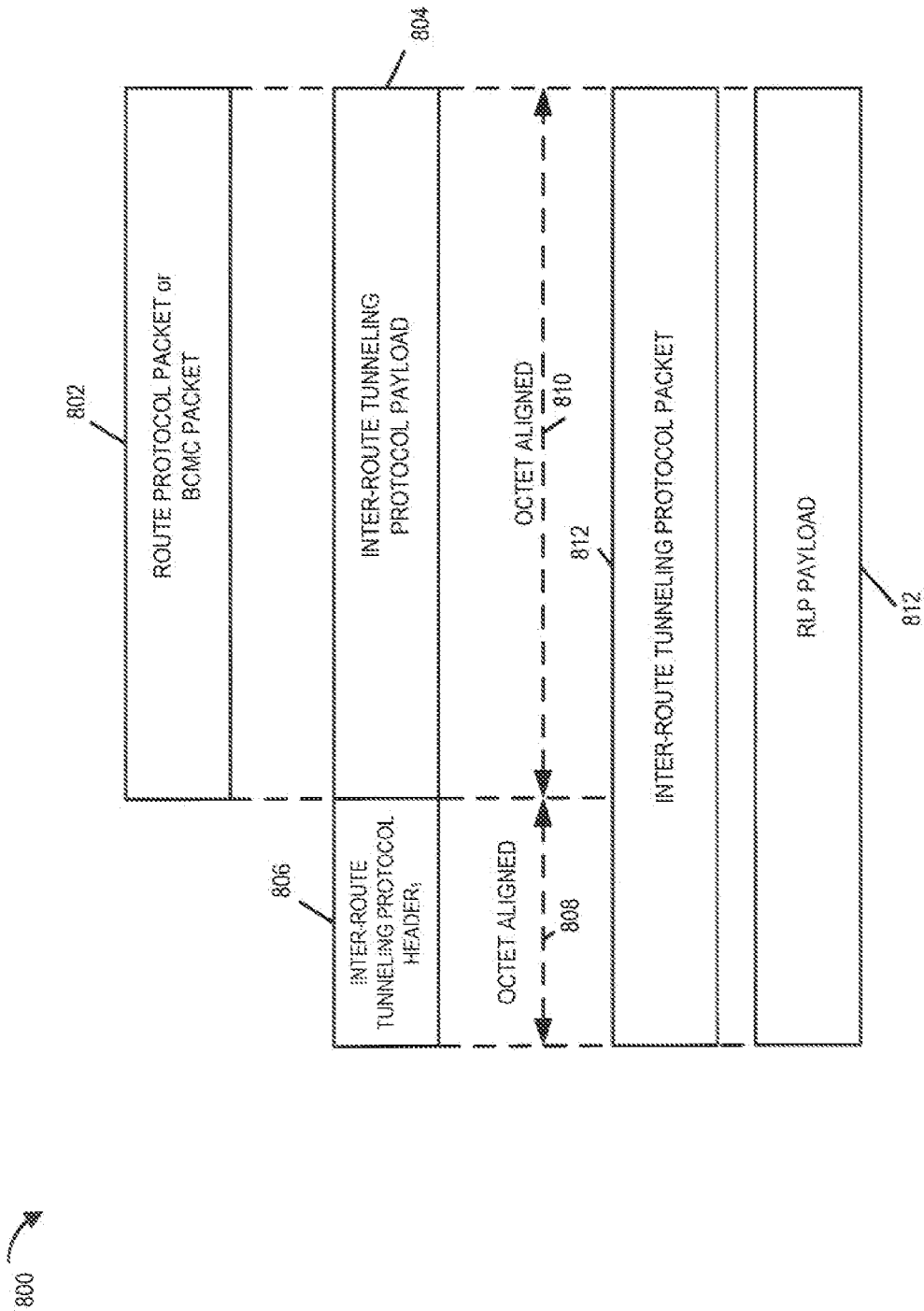
FIG. 8 is drawing of exemplary packet format information in accordance with various embodiments.

In various embodiments, the protocol data unit for this inter-route tunneling protocol is an Inter-Route Tunneling Protocol Packet. An Inter-Route Tunneling Protocol Packet comprises an Inter-Route Tunneling Protocol Payload and an Inter-Route Tunneling Protocol Header. FIG. 8 illustrates an exemplary inter-route tunneling protocol packet.

Figure 5:
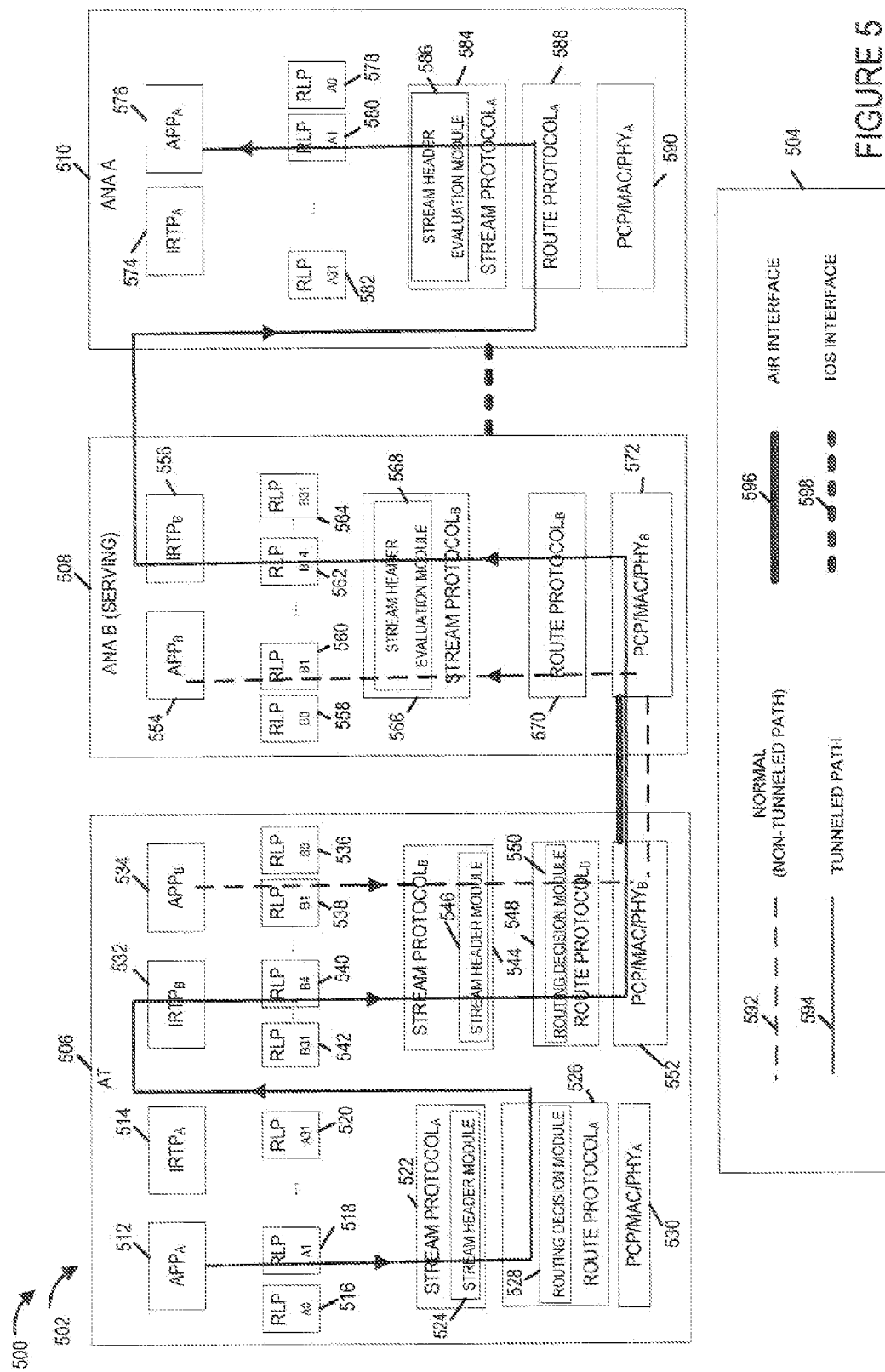
FIG. 5 is a drawing of an exemplary communications system and is used to explain exemplary uplink signaling flow including a non-tunneled path and a tunneled path in accordance with various embodiments.

FIG. 5 is a drawing 500 of an exemplary communications system 502 and a corresponding legend 504. FIG. 5 is used to explain an exemplary uplink signaling flow including a non-tunneled path, as indicated by dashed line 592 and a tunneled path as indicated by solid line 594. Exemplary communications system 502 including access terminal 506, access node assembly (ANA) B 508 and access node assembly A 510. With respect to AT 506, at the time of the flow shown in FIG. 5, access node assembly B 508 is a serving access node assembly and access node assembly A 510 is a remote access node assembly. AT 506 has a wireless communications link indicated by an air interface represented by heavy solid line 596 via which it communicates with serving access node assembly B 508. Access node assembly B 508 communicates with access node assembly A 510 via and IOS interface as indicated by heavy dashed line 598. At another time, the AT 506, e.g., when the AT 506 is located in the vicinity of access node assembly A 510, the AT 506 may have a wireless communications link with access node assembly A 510, and access node assembly A 510 may be the serving access node assembly with access node assembly B 508 being the remote access node assembly from the perspective of AT 506.

Access terminal 506 includes one or more application modules associated with access node assembly A 510 including application module A (APPA) 512, an inter-route tunneling protocol module A (ITRPA) 514, a first set of radio link protocol modules (RLPA0 516, RLPA1 518, . . . , RLP A31 520), stream protocol module A 522, route protocol module A 526, and PCP/MAC/PHY module A 530. Access terminal 506 also includes an inter-route tunneling protocol module B (ITRPB) 532, one or more application modules associated with access node assembly B 508 including application module B 534, a second set of radio link protocol modules (RLPB0 536, RLPB1 538, . . . , RLPB4 540, . . . , RLP B31 542), stream protocol module B 544, route protocol module B 548, and PCP/MAC/PHY module B 552.

Access node assembly B 508, which is a current serving access node assembly for AT 506, includes one or more application modules including application module B 554, inter-route tunneling protocol module B (IRTPB 556), a plurality of radio link protocol modules (RLPB0 558, . . . , RLPB1 560, . . . , RLPB4 562, . . . , RLPB31 564), stream protocol module B 566, route protocol module B 570, and PCP/MAC/PHY module B 572.

Access node assembly A 510, which is a current remote access node assembly for AT 506, includes one or more application modules including application module A 576, inter-route tunneling protocol module A (IRTPA 574), a plurality of radio link protocol modules (RLPA0 578, . . . , RLPA1 580, . . . , RLPA31 582), stream protocol module A 584, route protocol module A 588, and PCP/MAC/PHY module A 590.

Exemplary signaling flow for the normal non-tunneled path represented by dashed line 592 will now be described. Application module B 534 of AT 506 has information that it wants to communicate to corresponding application module B 554 of ANA B 508. APPB 534 which is associated with RLP B1 module 538 sends information to RLP B1 538, which generates radio link protocol packets. The generated radio link protocol packets are communicated to stream protocol module B 544. The stream protocol module B 544 generates stream protocol packets from the received radio link protocol packets. The stream protocol module B 544 includes a stream header module 546 which generates a stream header to be included in a stream protocol packet. In this case, the stream header identifies that the received RLP packets were communicated from RLP module B1 538 which is associated with an application and not with an inter-route tunneling protocol module. The generated stream protocol packets are communicated to the route protocol module B 548, which generates route protocol packets. The route protocol module B 548 includes a routing decision module 550. The routing decision module B 550 considers the current status of access node assembly B 508 and determines that it currently a serving access node assembly for AT 506; therefore, the generated route protocol packets are communicated to PCP/MAC/PHYB module 552, which processes the received route protocol packets and generates uplink signals, e.g., OFDM signals to be communicated over an air link. The module 552 has a wireless link with corresponding PCP/MAC/PHYB module 572 in access node assembly B 508, and via air interface 596, the generated uplink signals are communicated from module 552 to module 572.

PCP/MAC/PHYB module 572 recovers route protocol packets and communicates the route protocol packets to route protocol module B 570. Route protocol module B 570 recovers stream protocol packets and communicates the stream protocol packets to stream protocol module B 566. Stream protocol module B 566 recovers radio link protocol packets. Stream protocol module B 566 includes a stream header evaluation module 568 which evaluates the stream protocol header of a received packet to determine to routing for a recovered radio link protocol packet. In this example, the stream protocol header evaluation module 568 determines that the recovered radio link protocol packets should be routed to radio link protocol module B1 560, which is associated with application module APP B 554. The recovered radio link protocol packets are communicated to RLP B1 module 560 which recovers information and communicates the recovered information to APP B module 554.

Exemplary signaling flow for the tunneled path represented by solid line 594 will now be described. Application module A 512 of AT 506 has information that it wants to communicate to corresponding application module A 576 of ANA B 510. APPA 512 which is associated with RLP A1 module 518 sends information to RLP A1 518, which generates radio link protocol packets. The generated radio link protocol packets are communicated to stream protocol module A 522. The stream protocol module A 522 generates stream protocol packets from the received radio link protocol packets. The stream protocol module A 522 includes a stream header module 524 which generates a stream header to be included in a stream protocol packet. In this case, the stream header identifies that the received RLP packets were communicated from RLP module A1 518 which is associated with an application, APP A 512, and not with an inter-route tunneling protocol module. The generated stream protocol packets are communicated to the route protocol module A 526, which generates route protocol packets. The route protocol module A 526 includes a routing decision module 528. The routing decision module 528 considers the current status of access node assembly A 510 and determines that it is currently a non-serving, e.g., remote, access node assembly for AT 506 and that access node assembly B 508 is a current serving access node assembly for AT 506; therefore, the generated route protocol packets are communicated to the inter-route tunneling protocol module B (IRTPB) 532.

IRTPB 532 receives the route protocol packets and generates inter-route tunneling protocol packets including an inter-route tunneling protocol header which identifies access node assembly A 510 as being the intended destination of the route protocol packet included in the inter-route tunneling protocol packet. The inter-route tunneling protocol module B 532 is associated with RLP module B4 540. IRTPB module 532 communicates the generated inter-route tunneling protocol packets to RLP module B4 540 which generates radio link protocol packets which it sends to stream protocol module B 544. The stream protocol module B 544 generates stream protocol packets from the received radio link protocol packets. The stream protocol module B 544 includes a stream header module 546 which generates a stream header to be included in a stream protocol packet. In this case, the stream header identifies that the received RLP packets were communicated from RLP module associated with an inter-route tunneling protocol module and not an RLP module associated with an application, more specifically the stream header identifies RLP module B4 540 associated with inter-route tunneling protocol module B 532. The generated stream protocol packets are communicated to the route protocol module B 548, which generates route protocol packets. The route protocol module B 548 includes a routing decision module 550. The routing decision module B 550 considers the current status of access node assembly B 508 and determines that it currently a serving access node assembly for AT 506; therefore, the generated route protocol packets are communicated to PCP/MAC/PHYB module 552, which processes the received route protocol packets and generates uplink signals, e.g., OFDM signals to be communicated over an air link. The module 552 has a wireless link with corresponding PCP/MAC/PHYB module 572 in access node assembly B 508, and via air interface 596, the generated uplink signals are communicated from module 552 to module 572.

PCP/MAC/PHYB module 572 recovers route protocol packets and communicates the route protocol packets to route protocol module B 570. Route protocol module B 570 recovers stream protocol packets and communicates the stream protocol packets to stream protocol module B 566. Stream protocol module B 566 recovers radio link protocol packets. Stream protocol module B 566 includes a stream header evaluation module 568 which evaluates the stream protocol header of a received packet to determine routing for a recovered radio link protocol packet. In this example, the stream protocol header evaluation module 568 determines that the recovered radio link protocol packets should be routed to radio link protocol module B4 562, which is associated with inter-route tunneling protocol module B 566. The recovered radio link protocol packets are communicated to radio link protocol module B4 562 which recovers inter-route tunneling protocol packets and communicates those packets to inter-route tunneling protocol module B 556. Inter-route tunneling protocol module B 556 recovers route protocol packets. IRTP module B 556 identifies the destination of the recovered route protocol packets from an inter-route tunneling protocol header to be access node assembly A 510. The IRTP module B 556 communicates the recovered route protocol packets via IOS interface 598 to the route protocol A module 588 of the access node assembly A 510.

Route protocol module A 588 recovers stream protocol packets from the received route protocol packets and communicates the stream protocol packets to stream protocol module A 584. The stream protocol module A 584 recovers radio link protocol packets. The stream protocol module A 584 includes a stream header evaluation module 586, which evaluates a received stream protocol packet header to determine which radio link protocol module to communicate the corresponding recovered radio link protocol packet to. In this example, the stream protocol header evaluation module 586 determines that the recovered radio link protocol packets should be routed to radio link protocol module A1 580, which is associated with application module APP A 576. The recovered radio link protocol packets are communicated to RLP A1 module 580 which recovers information and communicates the recovered information to APP A module 576.

In some embodiments at a first point in time, an access node assembly A 510 operates as a serving access node assembly and then at a second point in time, e.g., following a handoff, operates as a non-serving access node assembly with a connection to the access terminal 506 through a second access node assembly B 508, which acts as the serving access node assembly at the second point in time. FIG. 5 is illustrative of the second point in time. During a period of time corresponding to the first point in time application packets from APPa 512 are subjected to a single RLP processing operation in the access terminal 506 prior to transmission over an air link to access node assembly A 510. However, following handoff packets corresponding to the same application 512 are subject to two levels of RLP processing in the access terminal 506 prior to transmission to access node assembly B 508. Thus, prior to handoff application packets are subjected to a single RLP processing operation corresponding to the access node assembly A 510 prior to transmission over an airlink, while after handoff, application packets are subjected to two RLP processing operations the first one corresponding to access node assembly A 510 with the result of that operation then being subjected to RLP processing corresponding to access node assembly B 508. In some cases, a portion of an application packet corresponding to application A 512 may be transmitted over the airlink to access node assembly A 510 while a second portion of the same application packet may be communicated, e.g., after handoff, by subjecting an unsent portion to an additional RLP processing operation corresponding to access node assembly B 508 which is the serving access node following the handoff. Thus, two portions of an application packet may be subject to different amounts of RLP processing depending on whether the portion is sent before or after handoff. In one such embodiment, the portion of the application packet which is subject to a single RLP processing operation is sent via a non-tunneled path and the second potion which is subjected to additional RLP processing operations is sent via a tunneled path. In such a case, the communicated application packet is reassembled by an RLP module in access node assembly A 510.

In the downlink case, an inverse procedure may occur. Application packets or portions of application packets corresponding to an application running on an access node assembly may be communicated at one time without being subjected to tunneling and at a second time communicated using tunneling. The tunneling may be used following a change in the serving access node assembly.

The described techniques can facilitate reliable, rapid and/or efficient handoffs.

Figure 6:
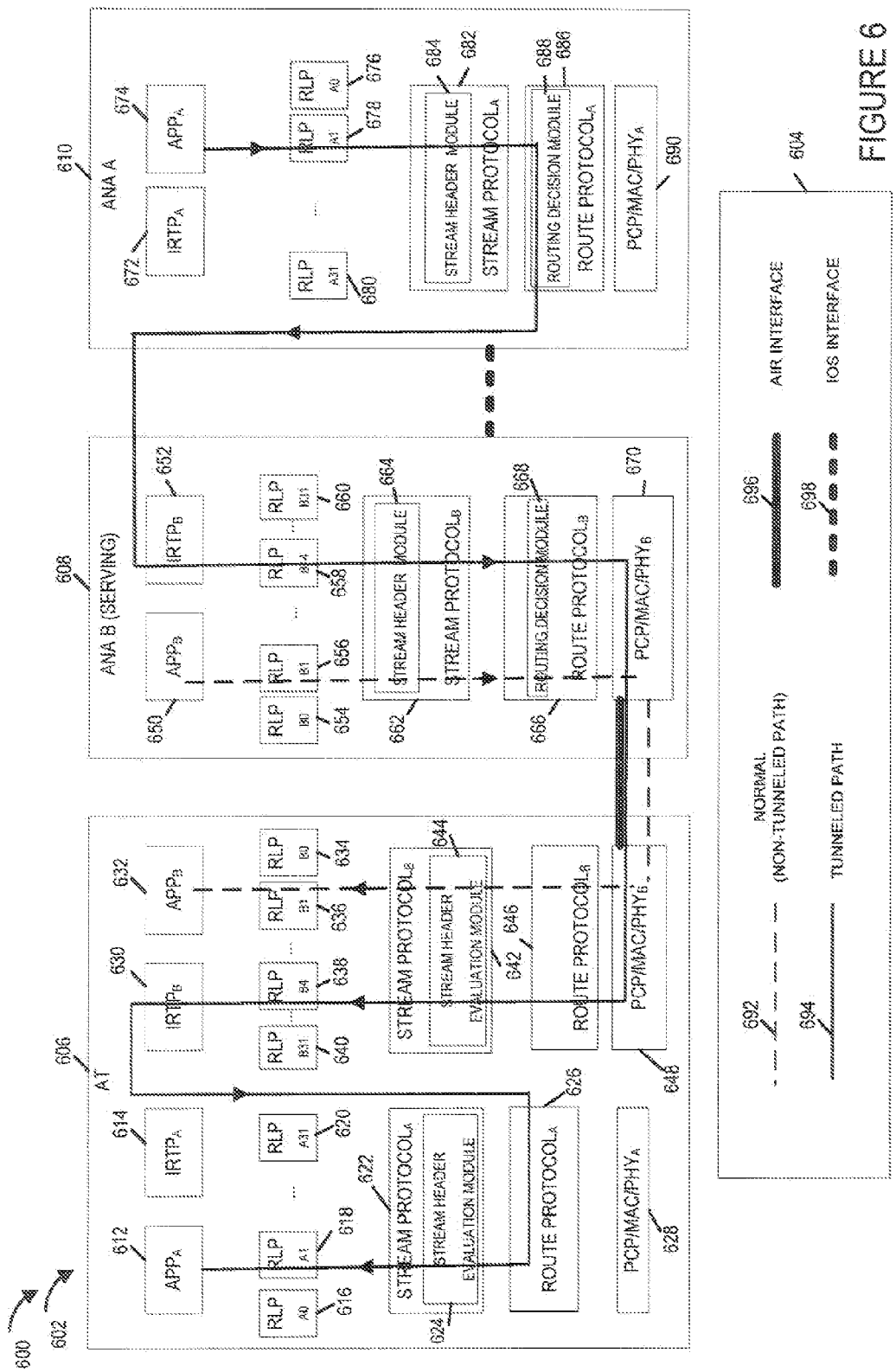
FIG. 6 is a drawing of an exemplary communications system and is used to explain exemplary downlink signaling flow including a non-tunneled path and a tunneled path.

FIG. 6 is a drawing 600 of an exemplary communications system 602 and a corresponding legend 604. FIG. 6 is used to explain exemplary downlink signaling flow including a non-tunneled path, as indicated by dashed line 692 and a tunneled path as indicated by solid line 694. Exemplary communications system 602 including access terminal 606, access node assembly (ANA) B 608 and access node assembly A 610. With respect to AT 606, at the time of the flow shown in FIG. 6, access node assembly B 608 is a serving access node assembly and access node assembly A 610 is a remote access node assembly. AT 606 has a wireless communications link indicated by an air interface represented by heavy solid line 696 via which it communicates with serving access node assembly B 608. Access node assembly B 608 communicates with access node assembly A 610 via and IOS interface as indicated by heavy dashed line 698. At another time, the AT 606, e.g., when the AT 606 is located in the vicinity of access node assembly A 610, the AT 606 may have a wireless communications link with access node assembly A 610, and access node assembly A 610 may be the serving access node assembly with access node assembly B 608 being the remote access node assembly from the perspective of AT 606.

Access terminal 606 includes one or more application modules associated with access node assembly A 610 including application module A (APPA) 612, an inter-route tunneling protocol module A (ITRPA) 614, a first set of radio link protocol modules (RLPA0 616, RLPA1 618, . . . , RLP A31 620), stream protocol module A 622, route protocol module A 626, and PCP/MAC/PHY module A 628. Access terminal 606 also includes an inter-route tunneling protocol module B (ITRPB) 630, one or more application modules associated with access node assembly B 608 including application module B 632, a second set of radio link protocol modules (RLPB0 634, RLPB1 636, . . . , RLPB4 638, . . . , RLP B31 640), stream protocol module B 642, route protocol module B 646, and PCP/MAC/PHY module B 648.

Access node assembly B 608, which is a current serving access node assembly for AT 606, includes one or more application modules including application module B 650, inter-route tunneling protocol module B (IRTPB 652), a plurality of radio link protocol modules (RLPB0 654, . . . , RLPB1 656, . . . , RLPB4 658, . . . , RLPB31 660), stream protocol module B 662, route protocol module B 666, and PCP/MAC/PHY module B 670.

Access node assembly A 610, which is a current remote access node assembly for AT 606, includes one or more application modules including application module A 674, inter-route tunneling protocol module A (IRTPA 672), a plurality of radio link protocol modules (RLPA0 676, RLPA1 678, . . . , RLPA31 680), stream protocol module A 682, route protocol module A 686, and PCP/MAC/PHY module A 690.

Exemplary signaling flow for the normal non-tunneled path represented by dashed line 692 will now be described. Application module B 650 of ANA B 608 has information that it wants to communicate to corresponding application module B 632 of AT 606. APPB 650 which is associated with RLP B1 module 656 sends information to RLP B1 656, which generates radio link protocol packets. The generated radio link protocol packets are communicated to stream protocol module B 662. The stream protocol module B 662 generates stream protocol packets from the received radio link protocol packets. The stream protocol module B 662 includes a stream header module 664 which generates a stream header to be included in a stream protocol packet. In this case, the stream header identifies that the received RLP packets were communicated from RLP module B1 656 which is associated with an application and not with an inter-route tunneling protocol module. The generated stream protocol packets are communicated to the route protocol module B 666, which generates route protocol packets. The route protocol module B 666 includes a routing decision module 668. The routing decision module 668 considers whether access node assembly B is a current serving access node assembly for AT 606 and determines that it currently a serving access node assembly for AT 606; therefore, the generated route protocol packets are communicated to PCP/MAC/PHYB module 670, which processes the received route protocol packets and generates downlink signals, e.g., OFDM signals to be communicated over an air link. The module 670 has a wireless link with corresponding PCP/MAC/PHYB module 648 in access terminal 606, and via air interface 696, the generated downlink signals are communicated from module 670 to module 648.

PCP/MAC/PHYB module 648 recovers route protocol packets and communicates the route protocol packets to route protocol module B 646. Route protocol module B 646 recovers stream protocol packets and communicates the stream protocol packets to stream protocol module B 642. Stream protocol module B 642 recovers radio link protocol packets. Stream protocol module B 642 includes a stream header evaluation module 664 which evaluates the stream protocol header of a received packet to determine routing for a recovered radio link protocol packet. In this example, the stream protocol header evaluation module 644 determines that the recovered radio link protocol packets should be routed to radio link protocol module B1 636, which is associated with application module APP B 632. The recovered radio link protocol packets are communicated to RLP B1 module 636 which recovers information and communicates the recovered information to APP B module 632.

Exemplary signaling flow for the tunneled path represented by solid line 694 will now be described. Application module A 674 of ANA A 610 has information that it wants to communicate to corresponding application module A 612 of AT 606. APPA 674 which is associated with RLP A1 module 678 sends information to RLP A1 678, which generates radio link protocol packets. The generated radio link protocol packets are communicated to stream protocol module A 682. The stream protocol module A 682 generates stream protocol packets from the received radio link protocol packets. The stream protocol module A 682 includes a stream header module 684 which generates a stream header to be included in a stream protocol packet. In this case, the stream header identifies that the received RLP packets were communicated from RLP module A1 678 which is associated with an application, APP A 674, and not with an inter-route tunneling protocol module. The generated stream protocol packets are communicated to the route protocol module A 686, which generates route protocol packets. The route protocol module A 686 includes a routing decision module 688. The routing decision module 688 considers whether AT A has a wireless communication link with ANA A 610, e.g., determines if ANA A is currently a serving access node assembly for AT 606, and determines that ANA A is currently a non-serving, e.g., remote, access node assembly with respect to AT 606 and that access node assembly B 608 is a current serving access node assembly for AT 606; therefore, the generated route protocol packets are communicated to the inter-route tunneling protocol module B (IRTPB) 652 of access node assembly B 608 via IOS interface 698.

IRTPB 652 receives the route protocol packets and generates inter-route tunneling protocol packets including an inter-route tunneling protocol header which identifies access node assembly A 610 as being the source of the route protocol packet included in the inter-route tunneling protocol packet. The inter-route tunneling protocol module B 652 is associated with RLP module B4 658. IRTPB module 652 communicates the generated inter-route tunneling protocol packets to RLP module B4 658 which generates radio link protocol packets which it sends to stream protocol module B 662. The stream protocol module B 662 generates stream protocol packets from the received radio link protocol packets. The stream protocol module B 662 includes a stream header module 664 which generates a stream header to be included in a stream protocol packet. In this case, the stream header identifies that the received RLP packets were communicated from RLP module associated with an inter-route tunneling protocol module and not an RLP module associated with an application, more specifically the stream header identifies RLP module B4 658 associated with inter-route tunneling protocol module B 652. The generated stream protocol packets are communicated to the route protocol module B 666, which generates route protocol packets. The route protocol module B 666 includes a routing decision module 668. The routing decision module 668 considers the current status of access node assembly B 608 from the perspective of AT 606 and determines that ANA B 608 is a currently serving access node assembly for AT 606; therefore, the generated route protocol packets are communicated to PCP/MAC/PHYB module 670, which processes the received route protocol packets and generates downlink signals, e.g., OFDM signals to be communicated over an air link. The module 670 has a wireless link with corresponding PCP/MAC/PHYB module 648 in access terminal 606, and via air interface 696, the generated downlink signals are communicated from module 670 to module 648.

PCP/MAC/PHYB module 648 recovers route protocol packets and communicates the route protocol packets to route protocol module B 646. Route protocol module B 646 recovers stream protocol packets and communicates the stream protocol packets to stream protocol module B 642. Stream protocol module B 642 recovers radio link protocol packets. Stream protocol module B 642 includes a stream header evaluation module 644 which evaluates the stream protocol header of a received packet to determine routing for a recovered radio link protocol packet. In this example, the stream protocol header evaluation module 644 determines that the recovered radio link protocol packets should be routed to radio link protocol module B4 638, which is associated with inter-route tunneling protocol module B 630. The recovered radio link protocol packets are communicated to radio link protocol module B4 638 which recovers inter-route tunneling protocol packets and communicates those packets to inter-route tunneling protocol module B 630. Inter-route tunneling protocol module B 630 recovers route protocol packets. IRTP module B 630 identifies the source of the recovered route protocol packets from an inter-route tunneling protocol header to be access node assembly A 610. The IRTP module B 630 communicates the recovered route protocol packets to the route protocol A module 626, the route protocol module in AT 606 which is associated with ANA 610.

Route protocol module A 626 recovers stream protocol packets from the received route protocol packets and communicates the stream protocol packets to stream protocol module A 622. The stream protocol module A 622 recovers radio link protocol packets. The stream protocol module A 622 includes a stream header evaluation module 624, which evaluates a received stream protocol packet header to determine which radio link protocol module to communicate the corresponding recovered radio link protocol packet to. In this example, the stream protocol header evaluation module 624 determines that the recovered radio link protocol packets should be routed to radio link protocol module A1 618, which is associated with application module APP A 612. The recovered radio link protocol packets are communicated to RLP A1 module 618 which recovers information and communicates the recovered information to APP A module 612.

Figure 7:
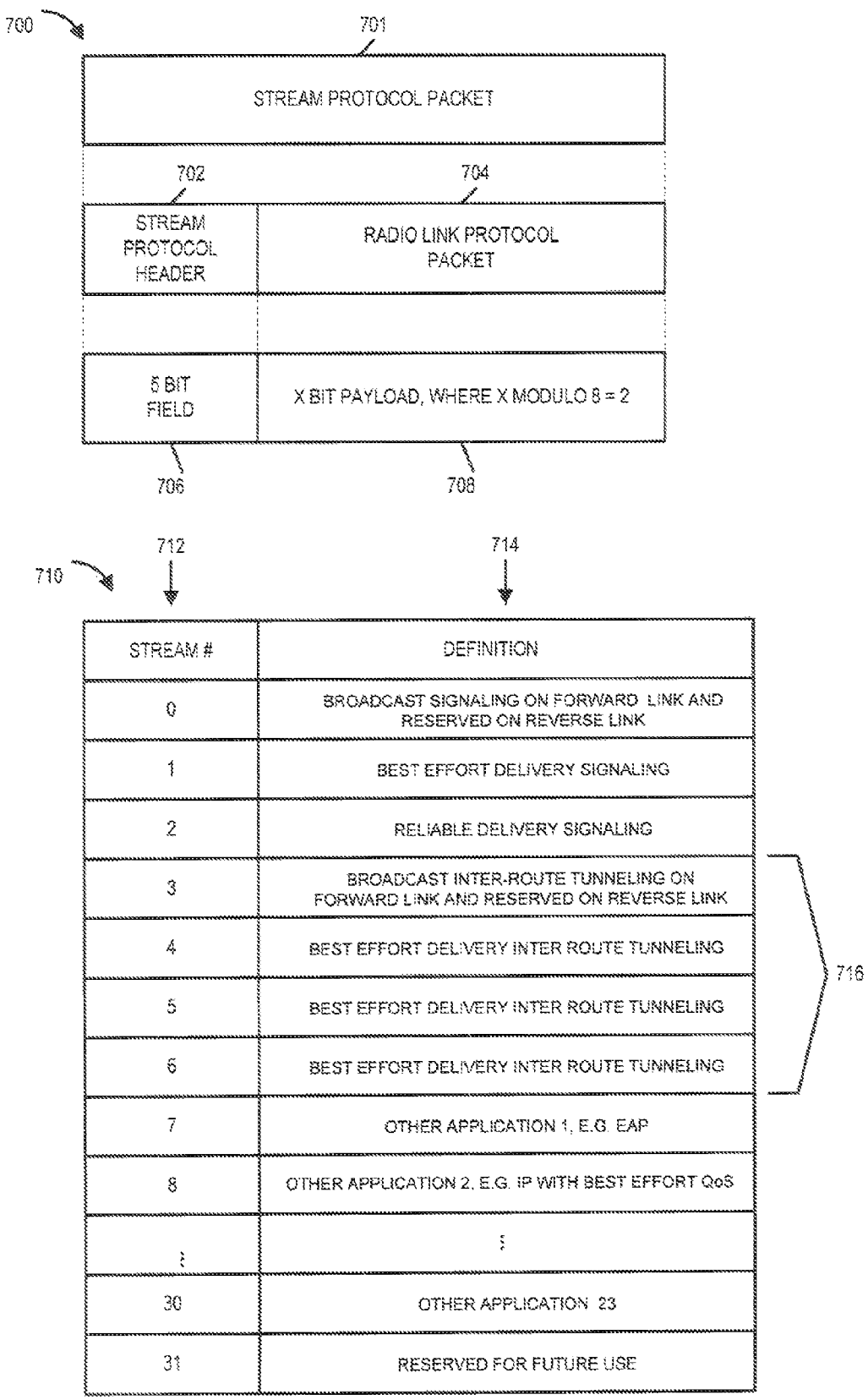
FIG. 7 includes a drawing illustrating exemplary stream protocol packet format and a table identifying exemplary stream numbers and corresponding exemplary stream definitions.

FIG. 7 includes a drawing 700 illustrating exemplary stream protocol packet format and a table 710 identifying exemplary stream numbers and corresponding stream definitions. Drawing 700 includes an exemplary stream protocol packet 701 which includes a stream protocol header portion 702 and a radio link protocol packet portion 704. In this example, the stream protocol header is a 5 bit field as indicated by block 706 and the radio link protocol packet is an X bit payload, where X modulo 8=2 as indicated by block 708.

Table 710 includes a first column 712 identifying stream number and a second column 714 identifying the corresponding stream definition. In this example, stream 0 corresponds to broadcast signaling in the forward link and is reserved on the reverse link; stream 1 corresponds to best effort delivery signaling, stream 2 corresponds to reliable delivery signaling; stream 3 corresponds to broadcast inter-route tunneling on the forward link and reserved on the reverse link; stream 4 corresponds to best effort delivery inter-route tunneling;

stream 5 corresponds to best effort delivery inter-route tunneling; stream 6 corresponds to best effort delivery inter-route tunneling; stream 7 corresponds to other application 1, e.g., EAP; stream 8 corresponds to other application 2, e.g., IP with best effort QoS; stream 9 corresponds to other application 3; stream 10 corresponds to other application 4, . . . , stream 30 corresponds to other application 23; stream 31 corresponds to a reserved stream for future use.

In this example, it should be observed that there are 32 different streams and four of those streams, indicated by bracket 716 correspond to inter-route tunneling. Let us assuming that stream protocol packet definitions of FIG. 7 are utilized in the systems of FIG. 5 and FIG. 6, let us also assume that a set of 32 RLP modules is associated with the 32 different streams. In our example, the inter-route tunneling protocol modules are associated with stream #4, a best effort delivery inter-route tunneling stream. In addition, the RLP modules associated with an application are associated with a non-tunneled stream. For example, application A module 512 is associated with RLP module A1 512 which may be designated to convey stream #1, a best effort delivery stream. Similarly, APP A module 674 is associated with RLP module A1 678 which may be designated to convey stream #1, a best effort delivery stream.

FIG. 8 is drawing of exemplary packet format information in accordance with various embodiments. Exemplary route protocol packet or BCMC packet 802 may, and sometimes does, correspond to an inter-router tunneling protocol payload 804. Inter-route tunneling protocol packet 812 includes an inter-route tunneling protocol header portion 806 and the inter-route tunneling protocol payload portion 804. Inter-route tunneling protocol header portion 806 is octet aligned as indicated by arrow 808; inter-route tunneling protocol payload 804 is also octet aligned as indicated by arrow 810. Inter-route tunneling protocol packet 812 can, and sometimes does, correspond to an RLP payload 812.

Figure 9:
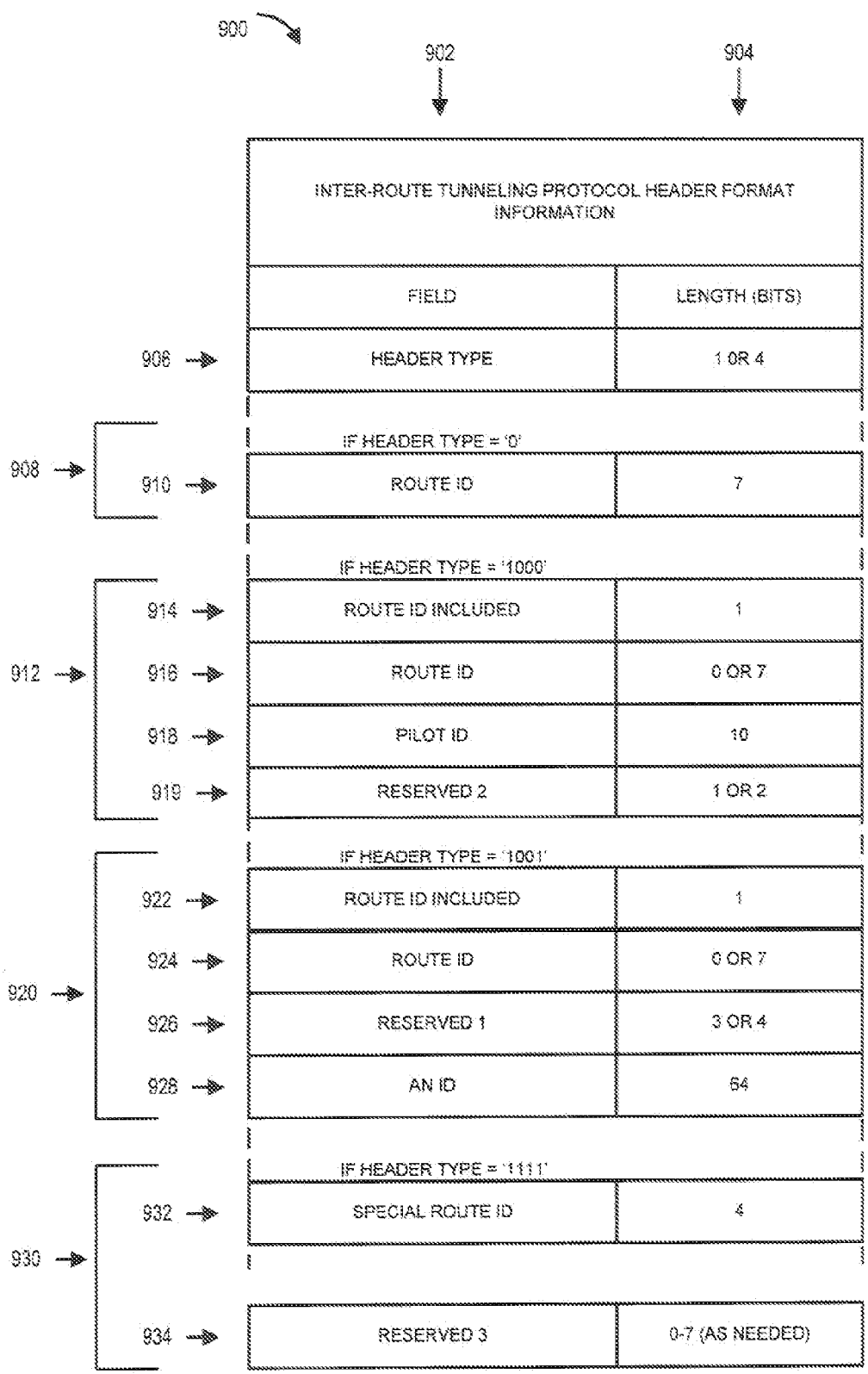
FIG. 9 is a drawing illustrating exemplary inter-route tunneling protocol header information in accordance with various embodiments.

FIG. 9 is a drawing 900 illustrating exemplary inter-route tunneling protocol header information in accordance with various embodiments. First column 902 identifies field information and second column 904 identifies field length information in bits. Row 906 identifies the header type field includes 1 or 4 bits.

Bracketed area 908 identifies additional fields if the header type field is 1 bit in length and conveys the value '0'. In such a case, the additional field is a route ID field which is a seven bit field, as indicated by row 910.

Bracketed area 912 identifies additional fields if the header type field is a 4 bit field and conveys the value '1000'. In such a case a route ID included field which is a 1 bit field is included as indicated by row 914; a route ID field is optionally included and if included has a field width of 7 bits as indicated by row 916; a pilot ID field is included and has a field width of 10 bits, as indicated by row 918, the reserved 2 field is included for padding to achieve octet alignment and is a 1 or 2 bit wide field as indicated by row 919.

Bracketed area 920 identifies additional fields if the header type field is a 4 bit field and conveys the value '1001'. In such a case a route ID included field which is a 1 bit field is included as indicated by row 922; a route ID field is optionally included and if included has a field width of 7 bits as indicated by row 924; a reserved one field is included as has a field width of 3 or 4 bits, the reserved field 1 used to achieve octet alignment in the inter-route tunneling protocol header, as indicated by row 926; and a access node identifier field which identifies an access node assembly and has a field width of 64 bits, as indicated by row 928.

Bracketed area 930 identifies additional fields if the header type field is a 4 bit field and conveys the value '1111'. In such a case a special route ID field which is a 4 bit field is included as indicated by row 932; and a reserved 3 field is optionally included having a field width up to 7 bits as needed, e.g., to achieve octet alignment in the inter-router tunneling protocol header, as indicated by row 934.

Additional information describing an exemplary Inter-Route Tunneling Protocol Header format used in one exemplary embodiment is described below.

Header Type The sender sets this field as specified in figure 1000 to indicate the type of Inter-Route Tunneling Protocol Header.

If the HeaderType field is set to '0', the sender includes the following one-field record RouteID The sender sets this field to the RouteID assigned to the Route to which this packet is destined.

If the HeaderType field is set to '1000', the sender includes the following three-field record:

RouteID Included The access terminal sets this field to '1'. The access node assembly sets this field to '0' if the packet being tunneled is a broadcast overhead message; otherwise, the access node assembly sets this field to '1'.

RouteID The sender omits this field if the RouteID Included field is set to '0'; otherwise the sender includes this field and sets it to the RouteID assigned to the Route to which this packet is destined.

PilotID The sender sets this field to the pilot identifier of a pilot belonging to the access node assembly to which this packet is destined.

If the HeaderType field is set to '1001', the sender includes the following three-field record:

RouteID Included The access terminal sets this field to '1'. The access network sets this field to '0' if the packet being tunneled is a broadcast overhead message; otherwise, the access network sets this field to '1'.

RouteID The sender omits this field if the RouteID Included field is set to '0'; otherwise, the sender includes this field and sets it to the RouteID assigned to the Route to which this packet is destined.

Reserved1 If the RouteID Included field is set to '0', then the length of this field is 3 bits; otherwise, length of this field is 4 bits. The sender sets bits in this field to 0. The receiver ignores these bits.

ANID The sender sets this field to the access node assembly identifier for the access node assembly to which this packet is destined.

Figure 10:
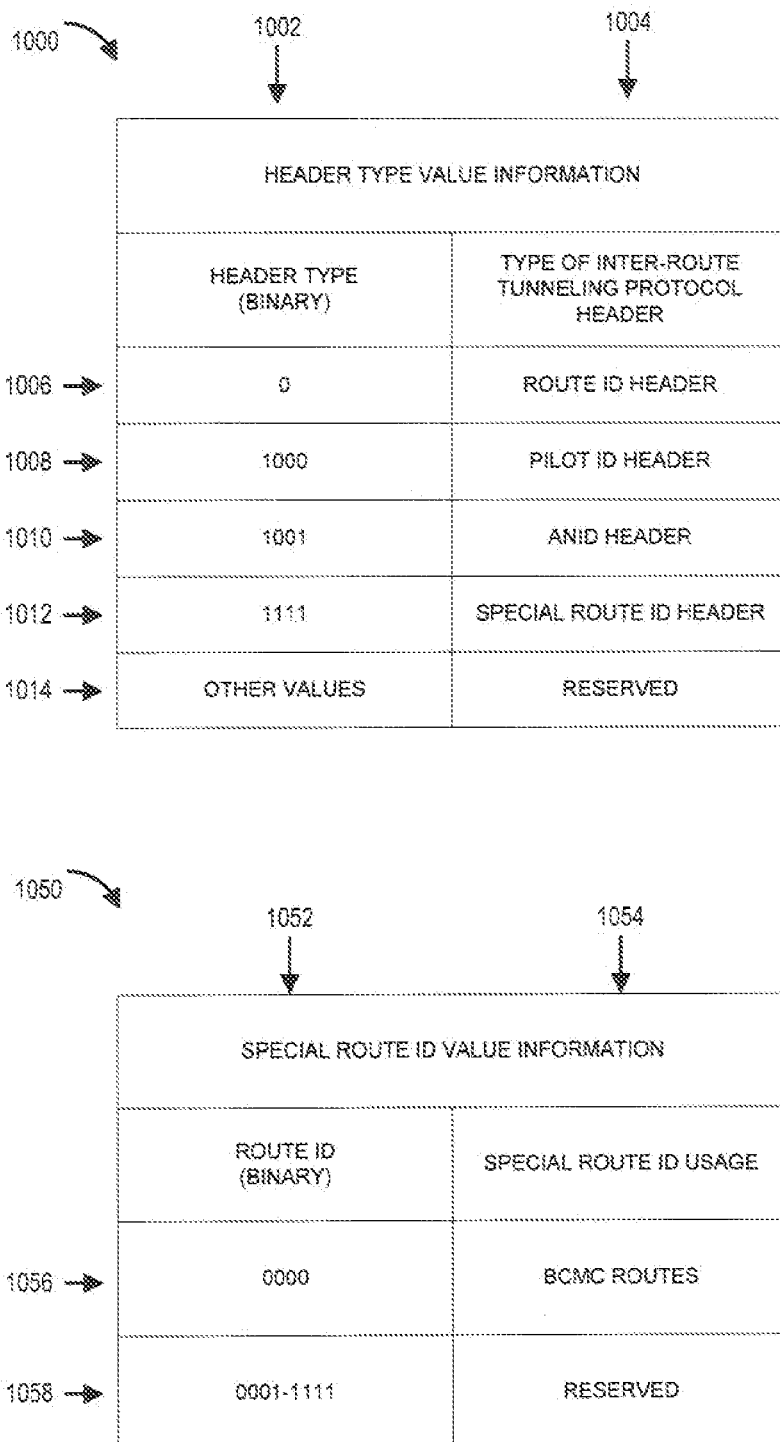
FIG. 10 includes a table illustrating exemplary header type value information corresponding to the header field of the inter-route tunneling protocol header described with respect to FIG. 9.

If the HeaderType field is set to '1111', the sender includes the following one-field record:

Special RouteID The sender sets this field to the special Route Identifier, as specified in table 1050 of FIG. 10, corresponding to the Route to which this packet is destined.

Reserved3 The sender includes zero to seven bits to make this InterRoute Tunneling Protocol Header octet-aligned. The sender sets these bits to 0. The receiver ignores these bits.

FIG. 10 includes a table 1000 illustrating exemplary header type value information corresponding to the header field of the inter-route tunneling protocol header described with respect to FIG. 9. First column 1002 lists exemplary header type bit patterns while second column 1004 lists exemplary types of an inter-router tunneling protocol header. Row 1006 identifies that header type value='0' corresponds to a route ID header. Row 1008 identifies that header type value='1000' corresponds to a pilot ID header. Row 1010 identifies that header type value='1110' corresponds to an ANID header.

Row 1012 identifies that header type value='1111' corresponds to a special route ID header. Row 1014 identifies that other values for the header type value are reserved, e.g., for future use.

FIG. 10 also includes a table 1050 illustrating exemplary special ID route value information. First column 1052 identifies possible values carried by the special Route ID header field, while second column 1054 lists the corresponding special route ID usage. First row 1056 indicates that a special route ID bit value='0000' identifies BCMC routes. Second row 1058 indicates that a special route ID bit value in the range of '0001'-'1111' is a reserved pattern, e.g., for future use.

Figure 11:
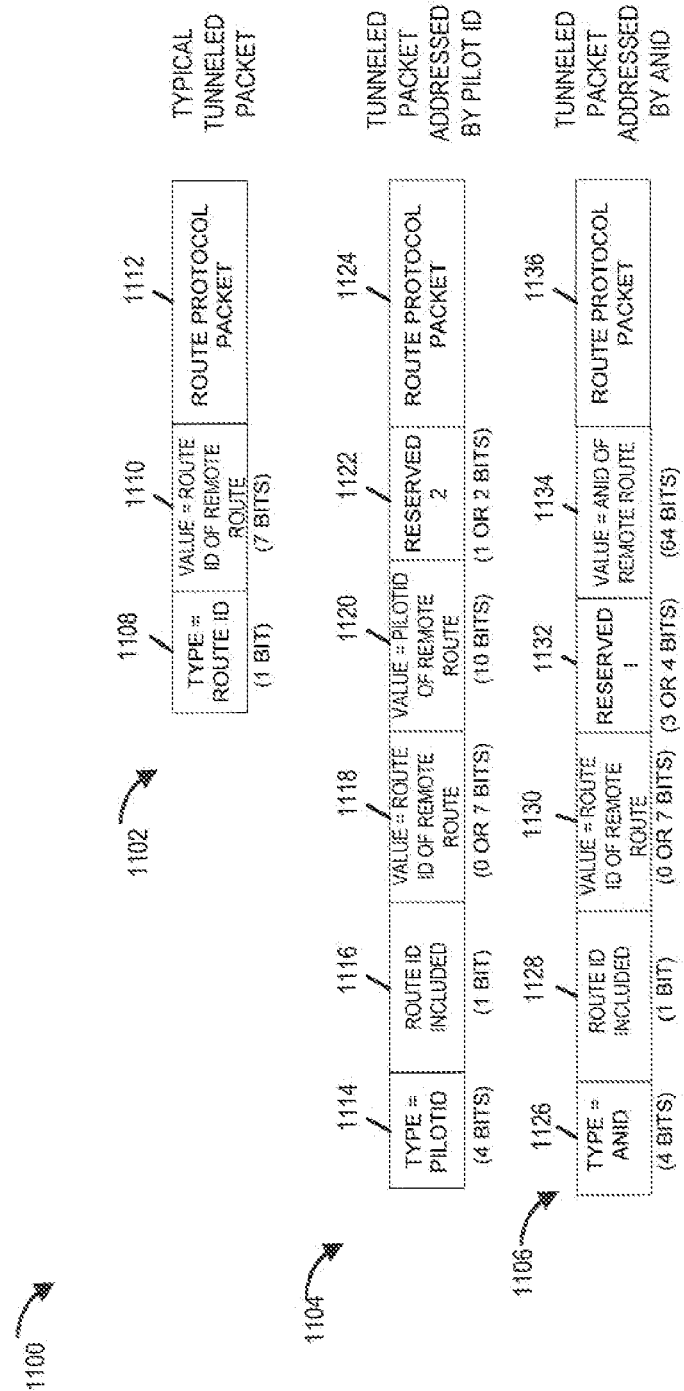
FIG. 11 is a drawing illustrating some exemplary inter-route tunneling protocol packets in accordance with various embodiments.

FIG. 11 is a drawing 1100 illustrating some exemplary inter-route tunneling protocol packets in accordance with various embodiments. Drawing 1102 corresponds to an exemplary typical tunneled packet including a header type field 1108 indicating that the type of inter-route tunneling protocol header is a route ID header, a route ID field 1110 conveys a value equal to the route ID of the remote route, and a payload portion 1112 conveying a route protocol packet.

Drawing 1104 corresponds to an exemplary tunneled packet addressed by pilot ID including a header type field 1114 indicating that the type of inter-route tunneling protocol header is a pilot ID header, a route ID included field 1116 conveying a value identifying whether or not the route ID field 1118 is to be included, an optional route ID field 1118 which, when included, conveys a value equal to the route ID of the remote route, a pilot ID field 1120 which conveys a value which equals the pilot ID of the remote route, an a reserved field 2 1122 used for bit padding to achieve octet alignment in the inter-route tunneling protocol header; and an a payload portion 1124 conveying a route protocol packet. If the route ID included field value indicates that the route ID field 1118 is included the reserved 2 field is 2 bits wide; if the route ID included field value indicates that the route ID field 1118 is not included the reserved 2 field is 1 bit wide.

Drawing 1106 corresponds to an exemplary tunneled packet addressed by ANID including a header type field 1126 indicating that the type of the inter-route tunneling protocol header is a access node ID header, a route ID included field 1128 conveying a value identifying whether or not the route ID field 1130 is to be included, an optional route ID field 1130 which, when included, conveys a value equal to the route ID of the remote route, a reserved field 1 1132 used for bit padding to achieve octet alignment, an ANID field 1134 conveying the ANID of the remote route, and a payload portion 1136 conveying a route protocol packet. If the route ID included field value indicates that the route ID field 1130 is included the reserved 1 field is 4 bits wide; if the route ID included field value indicates that the route ID field 1130 is not included the reserved 1 field is 3 bit wide.

Figure 12:
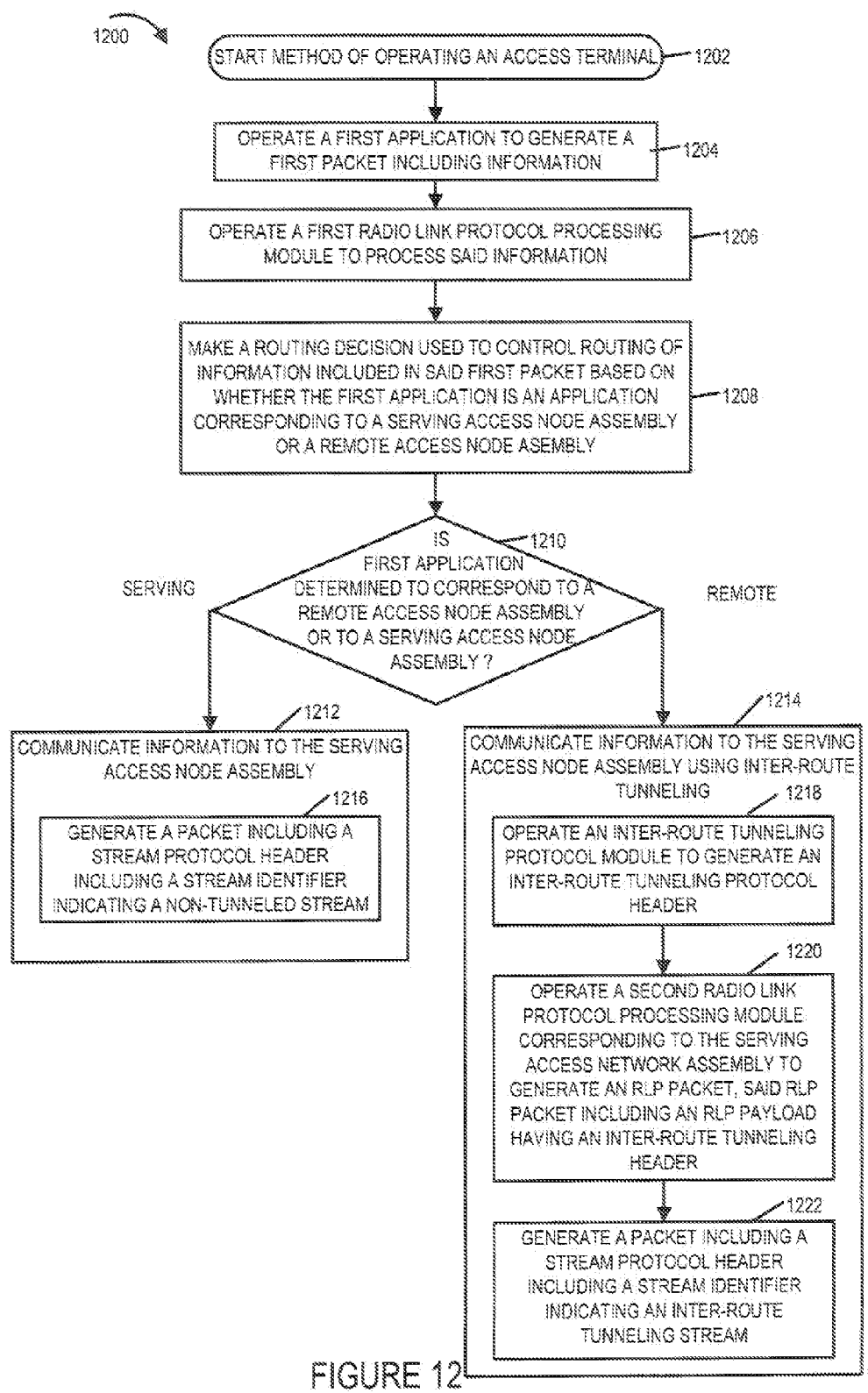
FIG. 12 is a flowchart of an exemplary method of operating an access terminal, e.g., a mobile wireless terminal, in accordance with various embodiments.

FIG. 12 is a flowchart 1200 of an exemplary method of operating an access terminal, e.g., a mobile wireless terminal, in accordance with various embodiments. The access terminal is, e.g., exemplary access terminal 502 of FIG. 5. Operation starts in step 1202 where the access terminal is powered on and initialized and proceeds to step 1204. In step 1204, the access terminal operates a first application to generate a first packet including information. Operation proceeds from step 1204 to step 1206. In step 1206, the access terminal operates a first radio link protocol processing module to process said information, e.g., generating an RLP packet or packets. If the first application corresponds to a serving access node assembly, then the first radio link protocol processing module also corresponds to the serving access node assembly. If the first application corresponds to a remote access node assembly, then the first radio link protocol processing module also corresponds to the remote access node assembly. Operation proceeds form step 1206 to step 1208.

In step 1208, the access terminal makes a routing decision used to control routing of information included in said first packet based on whether the first application is an application corresponding to a remote access node assembly or a serving access node assembly. Operation proceeds from step 1208 to step 1210. If the first application is determined to correspond to a remote access node assembly, then in step 1210 operation proceeds to step 1214. If the first application is determined to correspond to a serving access node assembly, then in step 1210 operation proceeds to step 1212.

In step 1212, the access terminal is operated to communicate information to the serving access node assembly. Step 1212 includes sub-step 1216 in which the access terminal generates a packet including a stream protocol header including a stream identifier indicating a non-tunneled stream.

Returning to step 1214, in step 1214 the access terminal communicates information to the serving access node assembly using inter-route tunneling. Step 1214 includes sub-steps 1218, 1220 and 1222. In sub-step 1218, the access terminal operates an inter-route tunneling protocol module to generate an inter-route tunneling protocol header. In some embodiments, the inter-route protocol tunneling header includes a header type value field indicating one of a route identifier, pilot identifier, access node identifier and predefined device identifier. Operation proceeds from sub-step 1218 to sub-step 1220. In sub-step 1220, the access terminal operates a second radio link protocol processing module corresponding to the serving access network assembly to generate an RLP packet, said RLP packet including an RLP payload having an inter-route tunneling header. Operation proceeds from step 1220 to step 1222. In step 1222, the access terminal generates a packet including a stream protocol header including a stream identifier indicating an inter-route tunneling stream.

Figure 13:
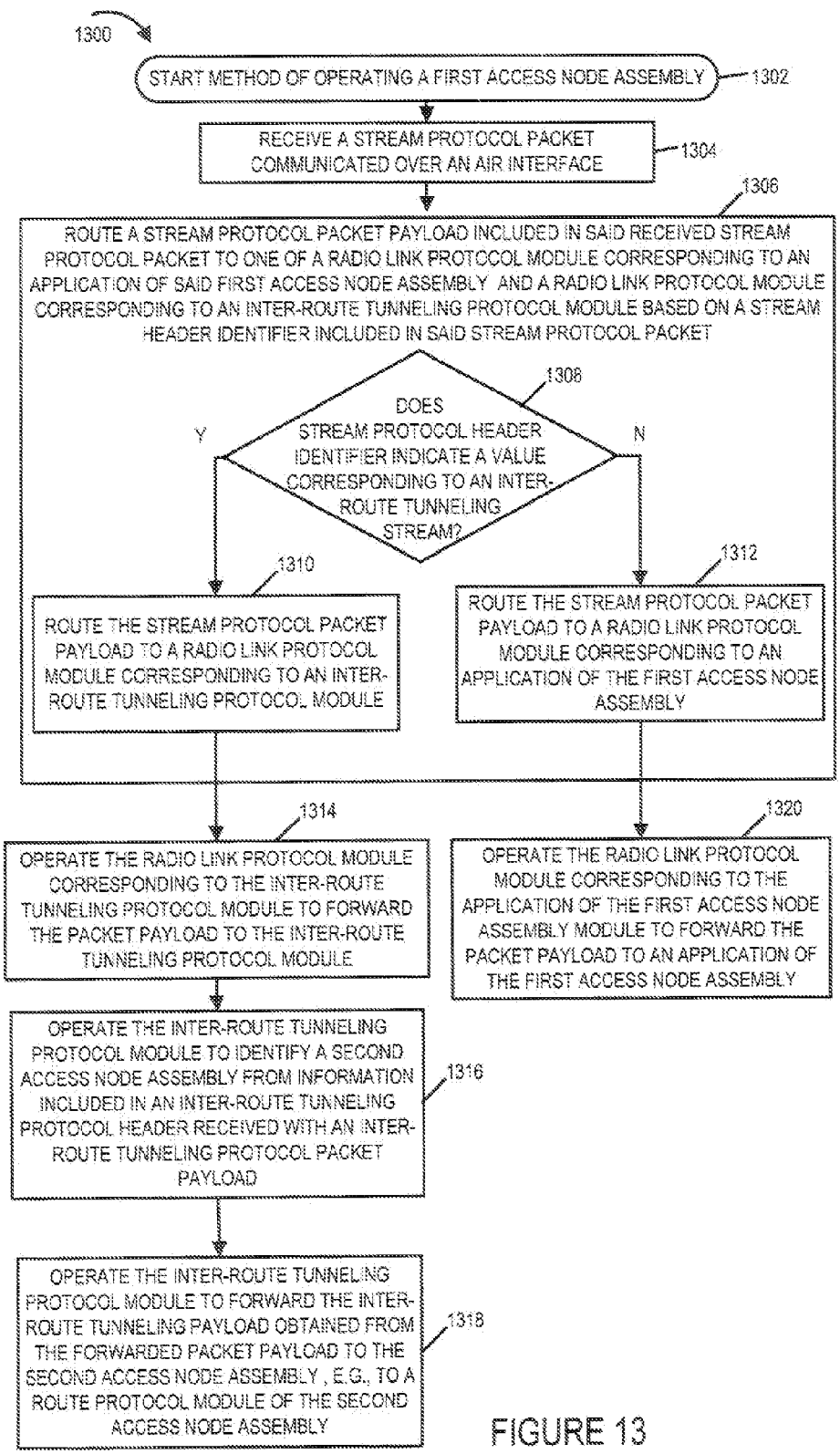
FIG. 13 is a flowchart of an exemplary method of operating a first access node assembly in accordance with various embodiments.

FIG. 13 is a flowchart 1300 of an exemplary method of operating a first access node assembly in accordance with various embodiments. The first access node assembly is, e.g., exemplary access node assembly 508 of FIG. 5. Operation starts in step 1302, where the first access node assembly is powered on and initialized and proceeds to step 1304. In step 1304 the first access node assembly receives a stream protocol packet which has been communicated over an air interface. Operation proceeds from step 1304 to step 1306.

In step 1306, the first access node assembly routes a stream protocol packet payload included in said received stream protocol packet to one of a radio link protocol module corresponding to an application of the first access node assembly and a radio link protocol module corresponding to an inter-route tunneling protocol module based on a stream header identifier included in said stream protocol packet. Step 1306 includes sub-steps 1308, 1310 and 1312.

In sub-step 1308, the first access node assembly evaluates the stream protocol header and proceeds differently depending on the result of the evaluation. If the first access node assembly determines that the stream protocol header identifier indicates a value corresponding to an inter-route tunneling stream, then operation proceeds from sub-step 1308 to sub-step 1310. If the first access node assembly determines that the stream protocol header identifier indicates a value that does not correspond to an inter-route tunneling stream then operation proceeds from sub-step 1308 to sub-step 1312.

Returning to sub-step 1310, in sub-step 1310, the first access node assembly routes the stream protocol packet payload to a radio link protocol module corresponding to an inter-route tunneling protocol module. Operation proceeds from sub-step 1310 to step 1314.

Returning to sub-step 1312, in sub-step 1312, the first access node assembly routes the stream protocol packet payload to a radio link protocol module corresponding to an application of the first access node assembly. Operation proceeds from sub-step 1312 to step 1320. In step 1320, the first access node assembly operates the radio link protocol module corresponding to the application of the first access node assembly module to forward the packet payload to an application of the first access node assembly.

Returning to step 1314, in step 1314, the first access node assembly operates the radio link protocol module corresponding to the inter-route tunneling protocol module to forward the packet payload to the inter-route tunneling protocol module. In some embodiments where RLP fragmentation has occurred to an inter-route tunneling protocol packet, the RLP module performs a packet defragmentation/reassembly operation to reconstruct the communicated inter-route tunneling protocol packet from a plurality of RLP packets. In such a case forwarding the packet payload to the inter-route tunneling protocol module is performed by forwarding the reassembled inter-route tunneling protocol packet. Operation proceeds from step 1314 to step 1316 in which the first access node assembly operates the inter-route tunneling protocol module to identify a second access node assembly from information included in an inter-route tunneling protocol header received with an inter-route tunneling protocol packet payload. In some embodiments, the inter-route tunneling protocol header includes a header type field value indicating one of: a route identifier, pilot identifier, access node identifier, and predefined device identifier.

Operation proceeds from step 1316 to step 1318. In step 1318, the first access node assembly operates the inter-route tunneling protocol module to forward the inter-route tunneling payload obtained from the forwarded packet payload to the second access node assembly, e.g., to a route protocol module of the second access node assembly.

Figure 14:
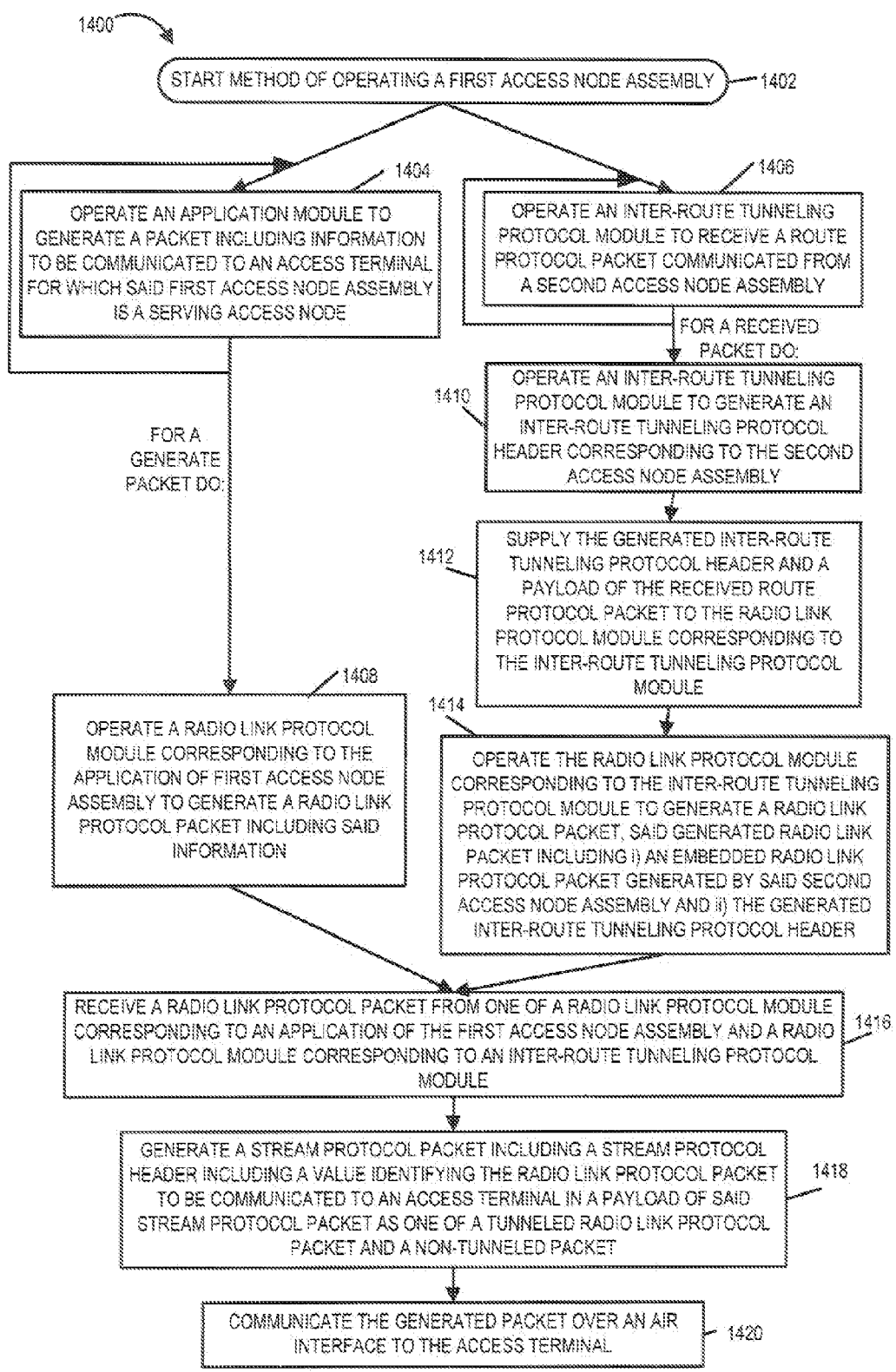
FIG. 14 is a flowchart of an exemplary method of operating a first access node assembly in accordance with various embodiments.

FIG. 14 is a flowchart 1400 of an exemplary method of operating a first access node assembly in accordance with various embodiments. The access node assembly is, e.g., exemplary access node assembly 608 of FIG. 6. Operation starts in step 1402, where the access node assembly is powered on and initialized. Operation proceeds from start step 1402 to step 1404 and/or step 1406.

In step 1404, the first access node assembly operates an application module to generate a packet including information to be communicated to an access terminal for which said first access node assembly is a serving access node. Step 1404 is performed on an ongoing basis. Operation proceeds from step 1404 to step 1408 in response to a generated packet. In step 1408 the first access node assembly operates a radio link protocol module corresponding to the application of the first access node assembly to generate a radio link protocol packet including said information to be communicated to the access terminal. Operation proceeds from step 1408 to step 1416.

Returning to step 1406, in step 1406, the first access node assembly operates an inter-route tunneling protocol module to receive a route protocol packet communicated from a second access node assembly. Step 1406 is performed on an ongoing basis. Operation proceeds from step 1406 to step 1410 in response to a received packet. In step 1410, the first access node assembly operates an inter-route tunneling protocol module to generate an inter-route tunneling protocol header corresponding to the second access node assembly. Operation proceeds from step 1410 to step 1412. In step 1412, the first access node assembly supplies the generated inter-route tunnel protocol header and payload of the received route protocol packet to the radio link protocol module corresponding to the inter-route tunneling protocol module. Operation proceeds from step 1412 to step 1414. In step 1414, the first access node assembly operates the radio link protocol module corresponding to the inter-route tunneling protocol module to generate a radio link protocol packet, said generated radio link protocol packet including: i) an embedded radio link protocol packet generated by said second access node assembly and ii) the generated inter-route tunneling protocol header. Operation proceeds from step 1414 to step 1416.

In step 1416, the first access node assembly operates a stream protocol module of the first access node assembly to receive a radio link protocol packet from one of a radio link protocol module corresponding to an application of the first access node assembly and a radio link protocol module corresponding to an inter-router tunneling protocol module. Operation proceeds from step 1416 to step 1418. In step 1418 the stream protocol module generates a stream protocol packet including a stream protocol header, the stream protocol header including a value identifying the radio link protocol packet to be communicated to an access terminal in a payload of said stream protocol packet as one of a tunneled radio link protocol packet and a nun-tunneled packet. In various embodiments, the inter-route tunneling protocol header includes a header type value field indicating one of a route identifier, pilot identifier, access node identifier, and predefined device identifier. Operation proceeds from step 1418 to step 1420. In step 1420, the first access node assembly communicates the generated packet over an airlink interface to the access terminal.

Figure 15:
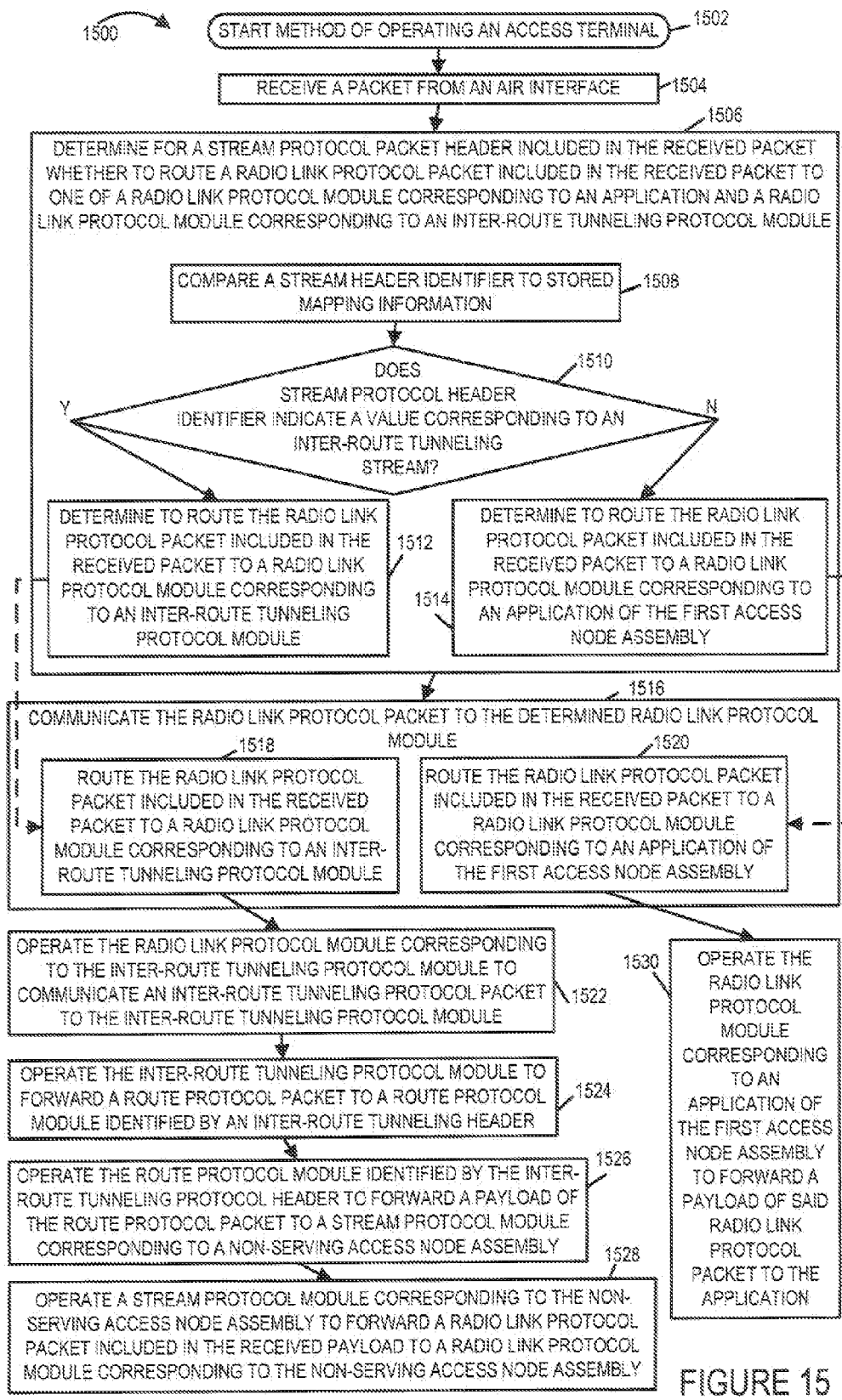
FIG. 15 is a flowchart of an exemplary method of operating an access terminal, e.g., a mobile wireless terminal, in accordance with various embodiments.

FIG. 15 is a flowchart 1500 of an exemplary method of operating an access terminal, e.g., a mobile wireless terminal, in accordance with various embodiments. The access terminal is, e.g., exemplary access terminal 606 of FIG. 6. Operation starts in step 1502, where the access terminal is powered on and initialized and proceeds to step 1504, where the access terminal receives a packet from an air interface. Operation proceeds from step 1504 to step 1506. In step 1506, the access terminal determines for a stream protocol packet header included in the received packet whether to route a radio link protocol packet included in the received packet to one of a radio link protocol module corresponding to an application and a radio link protocol module corresponding to an inter-route tunneling protocol module. Step 1506 includes sub-steps 1508, 1510, 1512 and 1514. In sub-step 1508 the access terminal compares a stream header identifier from the stream protocol packet header of the received packet to stored mapping information. Then, in sub-step 1510 the access terminal proceeds differently as a function of the comparison of sub-step 1508. If the stream header identifier indicates a value corresponding to an inter-route tunneling stream then operation proceeds from sub-step 1510 to sub-step 1512; otherwise operation proceeds from sub-step 1510 to sub-step 1514. In sub-step 1512, the access terminal determines to route the radio link protocol packet included in the received packet to a radio link protocol module corresponding to an inter-route tunneling protocol module. Returning to sub-step 1514, in sub-step 1514, the access terminal determines to route the radio link protocol packet included in the received packet to a radio link protocol module corresponding to an application of the first access node assembly.

Operation proceeds from step 1506 to step 1516, in which the access terminal communicates the radio link protocol packet to the determined radio link protocol module. Step 1516 includes sub-steps 1518 and 1520. If sub-step 1512 was performed, then, sub-step 1518 is performed. In sub-step

1518, the access terminal routes the radio link protocol packet included in the received packet to a radio link protocol module corresponding to an inter-route tunneling protocol module. Operation proceeds from sub-step 1518 to step 1522. If sub-step 1514 was performed, then, sub-step 1520 is performed. In sub-step 1520 the access terminal routes the radio link protocol packet included in the received packet to a radio link protocol module corresponding to an application of the first access node assembly. Operation proceeds from sub-step 1520 to step 1530.

Returning to step 1522, in step 1522 the access terminal operates the radio link protocol module corresponding to the inter-route tunneling protocol module to communicate an inter-router tunneling protocol packet to the inter-route tunneling protocol module. In some embodiments, at some times, the communicated inter-route tunneling protocol packet is a re-assembled packet which has been reassembled by the radio link protocol module corresponding to the inter-route tunneling protocol module from a plurality of received radio link protocol packets. Then, in step 1524, the access terminal operates the inter-route tunneling protocol module to forward a route protocol packet to a route protocol module identified by an inter-route tunneling protocol header. In various embodiments, the route protocol module identified in the inter-route tunneling protocol header corresponds to a non-serving access node assembly. In various embodiments, the inter-route tunneling header includes a header type value field indicating one of a route identifier, pilot identifier, access node identifier and predefined device identifier used to indicate the source of the tunneled packet. Operation proceeds from step 1524 to step 1526. In step 1526, the access terminal operates the route protocol module identified by the inter-route tunneling protocol header to forward a payload of the route protocol packet to a stream protocol module corresponding to a non-serving access node assembly. Operation proceeds from step 1526 to step 1528. In step 1528, the access terminal operates a stream protocol module corresponding to the non-serving access node assembly to forward a radio link protocol packet included in the received payload to a radio link protocol module corresponding to the non-serving access node assembly.

Returning to step 1530, in step 1530, the access terminal operates the radio link protocol module corresponding to an application of the first access node assembly to forward a payload of said radio link protocol packet to the application.

Figure 16:
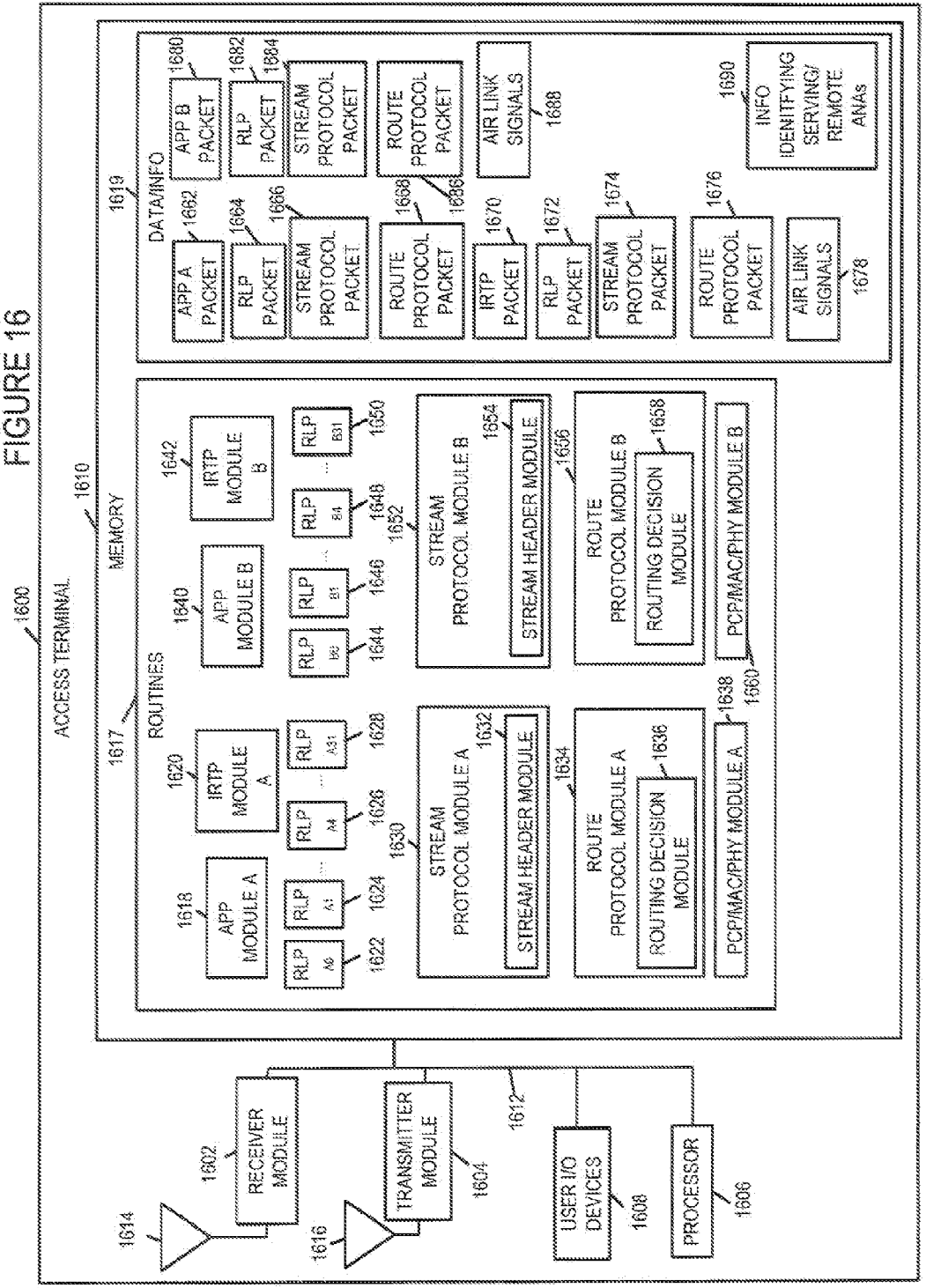
FIG. 16 is a drawing of an exemplary access terminal, e.g., a mobile wireless terminal, in accordance with various embodiments.

FIG. 16 is a drawing of an exemplary access terminal 1600, e.g., a mobile wireless terminal, in accordance with various embodiments. Exemplary access terminal 1600 is, e.g., exemplary access terminal 506 of FIG. 5 with similarly named modules in the two Figures being the same, e.g., Application A module 512 of FIG. 5 is Application module A 1618 of FIG. 16, IRTP A module 514 of FIG. 5 is IRTP module A 1620 of FIG. 16, etc.

Exemplary access terminal 1600 includes a wireless receiver module 1602, a wireless transmitter module 1604, user I/O devices 1608, a processor 1606 and memory 1610 coupled together via a bus 1612 over which the various elements may interchange data and information. Memory 1610 includes routines 1617 and data/information 1619. The processor 1606, e.g., a CPU, executes the routines 1617 and uses the data/information 1619 in memory 1610 to control the operation of the access terminal 1600 and implement methods, e.g., the method of flowchart 1200 of FIG. 12 or a method described with respect to FIG. 5.

Receiver module 1602, e.g., an OFDM wireless receiver, is coupled to receive antenna 1614 via which the access terminal 1600 receives downlink signals from an access node assembly, e.g., from a serving access node assembly. Transmitter module 1604, e.g., an OFDM wireless transmitter, is coupled to transmit antenna 1616 via which the access terminal 1600 transmits uplink signals to an access node assembly, e.g., to a serving access node assembly. Wireless transmitter module 1604 transmits a signal conveying information included in a packet from an application module over an air interface to a serving access node assembly. At some times transmitted signals convey inter-route tunneling protocol packets.

In some embodiments, the same antenna is used for transmitter and receiver. In some embodiments, multiple antennas are used and the access terminal 1600 supports MIMO signaling.

User I/O devices 1608 include, e.g., microphone, keyboard, keypad, switches, camera, speaker, display, etc. User I/O devices 1608 allow a user of access terminal 1600 in input data/information, e.g., for an application, access output data/information, and control at least some functions of the access terminal 1600.

Routines 1617 include one or more application modules including application module A 1618, inter-route tunneling protocol module A 1620, and a plurality of radio link protocol modules (RLP module A0 1622, RLP module A1 1624, . . . , RLP module A4 1626, . . . , RLP module A31 1628), a stream protocol module A 1630, a route protocol module A 1634 and a PCP/MAC/PHY module A 1638. In this example, RLP module A1 1624 corresponds to application module A 1618 and RLP module A4 1626 corresponds to IRTP module A 1620. Consider that application A is associated with a first access node assembly, e.g., access node assembly A. Also consider that ANA A can be and sometimes is, a remote access node assembly from the perspective of AT 1600.

Routines 1617 also include one or more application modules including application module B 1640, inter-route tunneling protocol module B 1642, and a plurality of radio link protocol modules (RLP module B0 1644, RLP module B1 1646, . . . , RLP module B4 1648, . . . , RLP module B31 1650), a stream protocol module B 1652, a route protocol module B 1656 and a PCP/MAC/PHY module B 1660. In this example, RLP module B1 1646 corresponds to application module B 1640 and RLP module B4 1648 corresponds to IRTP module B 1642. Consider that application B is associated with a second access node assembly, e.g., access node assembly B. Also consider that ANA B can be and sometimes is, a serving access node assembly from the perspective of AT 1600.

Data/information 1619 includes information identifying serving/remote access node assemblies 1690. The designation of an access node assembly as a serving or remote access node from the perspective of access terminal 1600 can change as the access terminal moves throughout the communications system. Data information 1619 includes information corresponding to a first signaling flow using inter-route tunneling including Application A packet 1662, RLP packet 1664, stream protocol packet 1666, route protocol packet 1668, IRTP packet 1670, RLP packet 1672, stream protocol packet 1674, route protocol packet 1676 and air link signals 1678. The first signaling flow may correspond to tunneled path 594 of FIG. 5. Data information 1619 also includes information corresponding to a second signaling flow which does not use inter-route tunneling including Application B packet 1680, RLP packet 1682, stream protocol packet 1684, route protocol packet 1686, and air link signals 1688. The second signaling flow may correspond to non-tunneled path 592 of FIG. 5.

Application module 1 1618 generates a first packet including information, e.g., application A packet 1662. The first application module 1618 is associated with radio link protocol module A1 1624 to which it sends the generated first packet including information. RLP module A1 1624 generates one or more radio link protocol packets, e.g., RLP packet 1664, corresponding to the received application packet. Other radio link protocols module, e.g., RLP A0 1662, are associated with other application modules. IRTP module A 1620 is associated with RLP A4 1626. The first set of RLP modules (1622, 1624, . . . , 1626, . . . , 1628) are associated with stream protocol module A 1630 and provide RLP packets to stream protocol module A 1630 as input. Application module A 1618 and the first set of RLP modules (1622, 1624, . . . , 1626, . . . , 1628) may be associated with a first access node assembly, e.g., a remote access node assembly. Each of the different RLP modules (1622, 1624, . . . , 1626, . . . , 1628) is associated with a different stream number.

Stream protocol module A 1630 generates a stream protocol packet including a stream protocol header and a payload including a radio link protocol packet. The radio link protocol packet may, and sometimes does, include information from the application packet. For example, stream protocol module A 1630 receives an input RLP packet 1664 from RLP A1 module 1624 and generates a stream protocol packet 1666, wherein the generated stream protocol packet 1666 includes a stream protocol header and a stream protocol payload, the stream protocol payload including the RLP packet 1664 which includes information from application A packet 1662. At other times, e.g., when RLP module A4 1626 supplies the RLP packet to the stream protocol A module 1630, the generated stream protocol packet includes information from the IRTP module A 1620.

Stream protocol module A 1630 includes stream header module 1632, which generates a stream header for a stream protocol packet as a function of the source of the RLP packet being processed. For example, consider that RLP packet 1664 which is sourced from RLP A1 module 1624 associated with APP module A 1618 is generated with a stream protocol header field value, e.g. 1, identifying the stream associated with application A module 1618 as a best effort delivery signaling stream. Alternatively, consider that the RLP packet used as input by stream protocol module A 1630 is sourced from RLP A4 module 1626, which is associated with IRTP module A 1620, then the stream protocol header field value, e.g., 4, identifies the stream associated with IRTP module A 1620 as a best effort delivery inter-route tunneling stream.

Route protocol module A 1634 receives a stream protocol packet from stream protocol module A 1630 and generates a route protocol packet. For example, route protocol module A 1634 receives stream protocol packet 1666 from stream protocol module A 1630 and generates route protocol packet 1668. Route protocol module A 1634 includes routing decision module 1636. Routing decision module 1636 makes a routing decision as a function of whether the access node assembly associated with route protocol module A 1634 is currently a serving or remote access node assembly from the perspective of AT 1600. In the case where application A module 1618 is the source of information included in the stream protocol packet, the routing decision module 1636 makes a routing decision used to control routing of information included in a packet from the application module based on whether the application is an application corresponding to a serving access node assembly or a remote access node assembly from the perspective of AT 1600. For example, the routing decision module 1636 decides whether to send a generated route protocol packet to PCP/MAC/PHY module A 1638 or IRTP module B 1642 depending upon whether the access node assembly corresponding to APP module A 1618 is a serving or remote access node assembly. Consider that the access node assembly associated with application A module 1618 is currently a remote access node assembly, routing decision module 1636 decides to route the route protocol packet to IRTP module B 1642. However, if the access node assembly associated with application A module 1618 was determined to be a current serving access node assembly, from the perspective of AT 1600, then the generated route protocol packet would have been communicated to PCP/MAC/PHY module A 1638 for communication over an air link to the serving access node assembly.

Application module B 1640 generates a packet including information, e.g., application B packet 1680. The application module B 1640 is associated with radio link protocol module B1 1646 to which it sends the generated packet including information. RLP module B1 1646 generates one or more radio link protocol packets, e.g., RLP packet 1682, corresponding to the received application packet 1680. Other radio link protocols modules, e.g., RLP B0 1644, are associated with other application modules. IRTP module B 1642 is associated with RLP B4 1648. The second set of RLP modules (1644, 1646, . . . , 1648, . . . , 1650) are associated with stream protocol module B 1652 and provide RLP packets to stream protocol module B 1652 as input. Application module B 1640 and the second set of RLP modules (1644, 1646, . . . , 1648, . . . , 1650) may be associated with a second access node assembly, e.g., a serving access node assembly. Each of the different RLP modules (1644, 1646, . . . , 1648, . . . , 1650) is associated with a different stream number.

Stream protocol module B 1652 generates a stream protocol packet including a stream protocol header and a payload including a radio link protocol packet. The radio link protocol packet may, and sometimes does, include information from the application packet. For example, stream protocol module B 1652 receives an input RLP packet 1682 from RLP B1 module 1646 and generates a stream protocol packet 1684, wherein the generated stream protocol packet 1684 includes a stream protocol header and a stream protocol payload, the stream protocol payload including the RLP packet 1682 which includes information from application B packet 1680. When RLP module B4 1648 supplies the RLP packet, e.g., RLP packet 1672, to the stream protocol B module 1652, the generated stream protocol packet includes information from the IRTP module B 1642. For example, IRTP module B 1642 receives route protocol packet 1668 including information included in application A packet 1662 and generates an inter-route tunneling packet therefrom. The inter-route tunneling protocol module B 1642 generates an inter-route tunneling protocol header including a header type value field indicating one of a route identifier, pilot identifier, access node identifier and predefined device identifier. The inter-route tunneling protocol header identifies the remote access node assembly, e.g., the remote access node assembly with respect to access terminal 1600 which corresponds to route protocol module A, RLP module A1 1624 and application module A 1618.

Stream protocol module B 1652 includes stream header module 1654, which generates a stream protocol header for a stream protocol packet as a function of the source of the RLP packet being processed. For example, consider that RLP packet 1682 which is sourced from RLP B1 module 1646 associated with APP module B 1640 is generated with a stream protocol header field value, e.g. 1, identifying the stream associated with application B module 1640 as a best effort delivery signaling stream. Alternatively, consider that the that RLP packet 1672 is used as input by stream protocol module B 1652 which is sourced from RLP B4 module 1648, which associated with IRTP module B 1642, then the stream protocol header field value e.g., 4, identifies the stream associated with IRTP module B 1642 as a best effort delivery inter-route tunneling stream.

Route protocol module B 1656 receives a stream protocol packet from stream protocol module B 1652 and generates a route protocol packet. For example, route protocol module B 1634 receives stream protocol packet 1684 from stream protocol module B 1652 and generates route protocol packet 1686. Also consider that route protocol module B 1652 receives stream protocol packet 1674 from stream protocol module B 1652 and generates stream protocol packet 1674. Route protocol module B 1656 includes routing decision module 1658. Routing decision module 1658 makes a routing decision as a function of whether the access node assembly associated with route protocol module B 1656 is currently a serving or remote access node assembly from the perspective of AT 1600. In the case where application B module 1640 is the source of information included in the stream protocol packet, the routing decision module 1658 makes a routing decision used to control routing of information included in a packet from the application module based on whether the application is an application corresponding to a serving access node assembly or a remote access node assembly from the perspective of AT 1600. For example, the routing decision module 1658 decides whether to send a generated route protocol packet to PCP/MAC/PHY module B 1660 or IRTP module A 1620 depending upon whether the access node assembly corresponding to APP module B 1640 is a serving or remote access node assembly. Consider that the access node assembly associated with application B module 1640 and route protocol module B is currently a serving access node assembly, routing decision module 1658 decides to route route protocol packet 1686 to PCP/MAC/PHY module B 1660. In addition, routing decision module 1658 also routes route protocol packet 1676 including inter-router tunneling protocol information to PCP/MAC/PHY module B 1660. The PCP/MAC/PHY modules, e.g., modules 1638 and 1660 interface with the wireless transmitter module 1604. Consider that PCP/MAC/PHY module B 1660 receives route protocol packet 1686 conveying some information from application B packet 1680 and generates air link signals 1688 which are transmitted via transmitter module 1604 and antenna 1616 to the serving access node where the application B packet information is recovered and delivered to the application. Also consider that PCP/MAC/PHY module B 1660 receives route protocol packet 1676 conveying some information from application A packet 1662 and generates air link signals 1678 which are transmitted via transmitter module 1604 and antenna 1616 to the serving access node where the serving access node recognizes a tunneled stream and forwards tunneled information to the remote access node assembly.

In various embodiments, the RLP modules perform fragmentation of received packets. In some such embodiments, an application module packet may be and sometimes is, fragmented into a plurality of RLP packets. In some such embodiments, at times, some of the RLP packets corresponding to an application packet are transmitted from access terminal 1600 as a tunneled packet while different RLP packets corresponding to the same application packet are transmitted from the access terminal 1600 as a non-tunneled packet. For example, the access terminal 1600 may change its point of network attachment during the process of sending RLP packets corresponding to an application module and a routing decision module may change the routing path.

Figure 17:
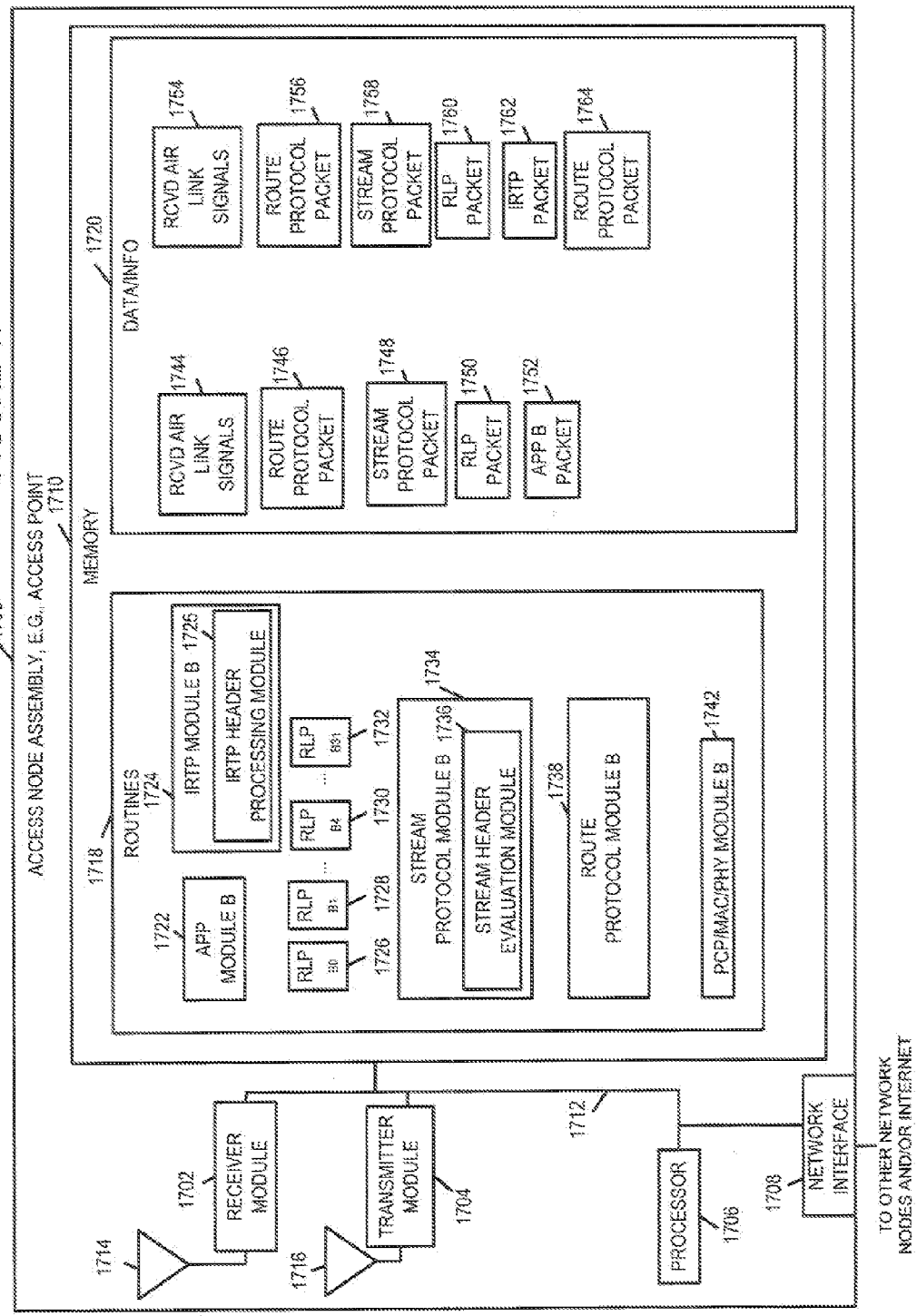
FIG. 17 is a drawing of an exemplary access node assembly, e.g., an exemplary access point, in accordance with various embodiments.

FIG. 17 is a drawing of an exemplary access node assembly 1700, e.g., access point or base station, in accordance with various embodiments. Exemplary access node assembly 1700 is, e.g., serving access node assembly B 508 of FIG. 5. Similarly named elements in ANA B 508 of FIG. 5 and ANA 1700 of FIG. 17 may be the same, e.g., application module B 1722 is application module B 554 of FIG. 5, inter-route tunneling protocol module B 1724 of FIG. 17 is ITRPB 556 of FIG. 5.

Exemplary access node assembly 1700 includes a receiver module 1702, a transmitter module 1704, a processor 1706, a network interface 1708, and memory 1710 coupled together via a bus 1712 over which the various elements may interchange data and information. The processor 1706, e.g., a CPU, executes the routines 1718 and uses the data/information 1720 in memory 1710 to control the operation of the access node assembly 1700 implement a method, e.g., the method of flowchart 1300 of FIG. 13 or a method described with respect to ANA B 508 of FIG. 5.

Routines 1718 include one or more application modules including application module B 1722, an inter-route tunneling protocol module B 1724, a plurality of radio link protocol modules (RLP module B0 1726, RLP module B1 1728, . . . , RLP module B4 1730, . . . , RLP module B31 1732), a stream protocol module B 1734, a route protocol module B 1738 and a PCP/MAC/PHY module B 1742. In this example, RLP module B1 1728 is coupled to application B module 1722, and RLP module B4 1730 is coupled to IRTP module B 1724.

Data/information 1720 includes information corresponding to a non-tunnel flow: received air link signals 1744, route protocol packet 1746, stream protocol packet 1748, RLP packet 1750, and application B packet 1752. Data/information 1720 also includes information corresponding to a tunneled flow: received air link signals 1754, route protocol packet 1756, stream protocol packet 1758, RLP packet 1760, IRTP packet 1762 and route protocol packet 1764.

Receiver module 1702, e.g., an OFDM wireless receiver module, is coupled to receive antenna 1714 via which the access node assembly 1700 receives uplink signals from access terminals. Receiver module 1702 receives signals conveying a stream protocol packet communicated over an air interface from an access terminal. For example, received air link signals 1744 convey stream protocol packet 1748, e.g., as part of route protocol packet 1746. As another example, received air link signals 1754 convey stream protocol packet 1758, e.g., as part of router protocol packet 1756.

Transmitter module 1704, e.g., an OFDM transmitter, is coupled to transmit antenna 1716 via which the access node assembly 1700 transmits downlink signals. In some embodiments, the same antenna is used for transmitter and receiver. In some embodiments, multiple antennas are used. In some embodiments, the access node assembly supports MIMO signaling.

Network interface 1708 couples the access node assembly 1700 to other nodes, e.g., other access node assemblies, and/or the Internet.

Application module B 1722 receives packets of information from a radio link protocol module corresponding to the application module 1722. For example, application module B 1722 receives application B packet 1752 from RLP module B1 1728, and RLP module B1 1728 corresponds to application module B 1722.

Stream protocol module 1734 processes a conveyed stream protocol packet and determines routing of a stream protocol packet payload included in said conveyed stream protocol packet to one of: i) a radio link protocol module corresponding to an application module of access node assembly 1700 and ii) a radio link protocol module corresponding to inter-route tunneling protocol module. For example RLP module B1 1728 corresponds to application module 1722 and RLP module B4 1730 corresponds to IRTP module 1724. Stream protocol module B 1734 includes stream header evaluation module 1736. Stream header evaluation module determines the routing of a stream protocol packet payload based on a stream header identifier included in the conveyed stream protocol packet.

Inter-route tunneling protocol module B 1724 receives IRTP packets from RLP module B4 1730 and generates route protocol packets. IRTP module B 1724 also determines an other access node assembly to send the generated route protocol packet to, e.g., via a backhaul network using network interface 1708. IRTP module B 1724 includes an inter-route header processing module 1725 which identifies the other access node assembly to which a generated route protocol packet is to be communicated. The generated route protocol packet is generated from one or more packets received from RLP module B4 1730. In various embodiments, the inter-route tunneling protocol header includes i) a header type value field indicating one or a router identifier, pilot identifier, access node identifier; and ii) a corresponding value, said inter-router protocol header processing module identifying said another access node assembly based on the indicated header type and the corresponding value.

An exemplary flow of a non-tunnel case will now be described. PCP/MAC/PHY module B 1742 receives received air link signals 1744 processes the signals and outputs route protocol packet 1746 to route protocol module B 1738. Route protocol module B 1730 processes the route protocol packet 1746 and outputs stream protocol packet 1748 to stream protocol module 1734. The stream protocol module 1734 processes the stream protocol packet 1748 and recovers an RLP packet 1750. Stream header evaluation module 1736 identifies that the recovered RLP packet should be communicated to RLP module B1 1728. Stream protocol module B 1734 communicates the RLP packet 1750 to RLP module B1 1728. RLP module B1 1728 uses the received RLP packet 1750 to generate application B packet 1752 which is communicates to application module B 1722. RLP module operation may, and sometimes do, include de-fragmentation operations. Application module B 1722 uses the received application B packet, originally sourced from an AT. In this example, the AT which is the source of application B packet 1752 considers access node assembly 1700 to be a serving access node assembly.

An exemplary flow of a tunneled case with now be described. PCP/MAC/PHY module B 1742 receives received air link signals 1754 processes the signals and outputs route protocol packet 1756 to route protocol module B 1738. Route protocol module B 1730 processes the route protocol packet 1756 and outputs stream protocol packet 1758 to stream protocol module 1734. The stream protocol module 1734 processes the stream protocol packet 1758 and recovers an RLP packet 1760. Stream header evaluation module 1736 identifies that the recovered RLP packet 1760 should be communicated to RLP module B4 1730. Stream protocol module B 1734 communicates the RLP packet 1760 to RLP module B4 1730. RLP module B4 1730 uses the received RLP packet 1760 to generate IRTP packet 1762 which is communicates to IRTP B module 1724. RLP module operation may, and sometimes does, include de-fragmentation operations. IRTP module B 1724 generates a route protocol packet 1764 which it communicates to another access node assembly via a backhaul network link, e.g., via network interface 1708. IRTP header processing module 1725 identifies the destination access node assembly from information included in the header.

Figure 18:
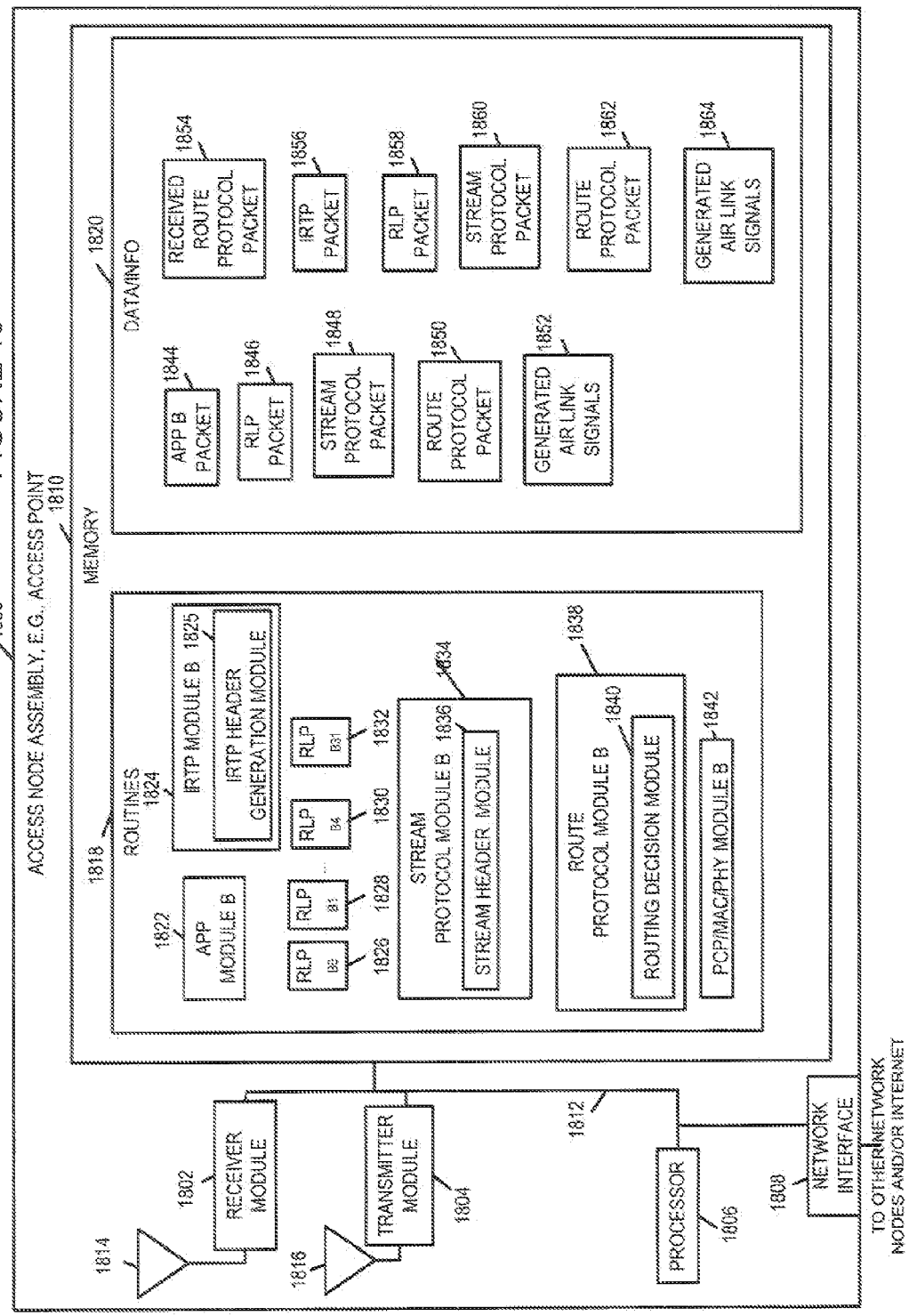
FIG. 18 is a drawing of an exemplary access node assembly, e.g., an exemplary access point, in accordance with various embodiments.

FIG. 18 is a drawing of an exemplary access node assembly 1800, e.g., access point or base station, in accordance with various embodiments. Exemplary access node assembly 1800 is, e.g., serving access node assembly B 608 of FIG. 6. Similarly named elements in ANA B 608 of FIG. 6 and ANA 1800 of FIG. 18 may be the same, e.g., application module B 1822 is application module B 650 of FIG. 6, inter-route tunneling protocol module B 1824 of FIG. 18 is ITRPB 652 of FIG. 6.

Exemplary access node assembly 1800 includes a receiver module 1802, a transmitter module 1804, a processor 1806, a network interface 1808, and memory 1810 coupled together via a bus 1812 over which the various elements may interchange data and information. The processor 1806, e.g., a CPU, executes the routines 1818 and uses the data/information 1820 in memory 1810 to control the operation of the access node assembly 1800 implement a method, e.g., the method of flowchart 1400 of FIG. 14 or a method described with respect to ANA B 608 of FIG. 6.

Routines 1818 include one or more application modules including application module B 1822, an inter-route tunneling protocol module B 1824, a plurality of radio link protocol modules (RLP module B0 1826, RLP module B1 1828, ..., RLP module B4 1830, ..., RLP module B31 1832), a stream protocol module B 1834, a route protocol module B 1838 and a PCP/MAC/PHY module B 1842. In this example, RLP module B1 1828 is coupled to application B module 1822, and RLP module B4 1830 is coupled to IRTP module B 1824. The radio link protocol modules (1826, 1828, ..., 1830, ..., 1832) are coupled to stream protocol module B 1834.

Data/information 1820 includes information corresponding to a non-tunneled flow: application B packet 1844, RLP packet 1846, stream protocol packet 1848, route protocol packet 1850 and generated air link signals 1852. Data/information 1820 also includes information corresponding to a tunneled flow: received route protocol packet 1854, IRTP packet 1856, RLP packet 1858, stream protocol packet 1860, route protocol packet 1862 and generated air link signal 1864.

Receiver module 1802, e.g., an OFDM wireless receiver module, is coupled to receive antenna 1814 via which the access node assembly 1800 receives uplink signals from access terminals.

Transmitter module 1804, e.g., an OFDM transmitter, is coupled to transmit antenna 1816 via which the access node assembly 1800 transmits downlink signals. Wireless transmitter module 1804 transmits signals conveying a generated packet over an air interface to an access terminal. Some signals convey information sourced from access node assembly 1800, e.g., a application of ANA 1800; other signals convey tunneled information originally sourced from a different access node assembly, e.g., a remote access node assembly from the perspective of the access terminal.

In some embodiments, the same antenna is used for transmitter and receiver. In some embodiments, multiple antennas are used. In some embodiments, the access node assembly supports MIMO signaling.

Network interface 1808 couples the access node assembly 1800 to other nodes, e.g., other access node assemblies, and/or the Internet.

Stream protocol module B 1834, e.g., a stream protocol packet generation module, generates a stream protocol packet including a stream protocol packet header including a value identifying a radio link protocol packet to be communicated to an access terminal in a payload of said stream protocol packet, as one of a tunneled radio link protocol packet and a non-tunneled packet. Stream header module 1836 generates the appropriate stream header which identifies the stream.

Inter-route tunneling protocol module B 1824 receives a route protocol packet communicated from another access node assembly via network interface 1808 and generates an inter-route tunneling protocol packet, which it communicates to RLP module B4 1830. Inter-route tunneling protocol module B 1824 includes IRTP header generation module 1825 for generating an inter-route protocol tunneling header corresponding to another access node, e.g., the source of the route protocol packet being processed. In various embodiments, the inter-route tunneling protocol header includes a header type value field indicating one of a route identifier, pilot identifier, access node identifier and predefined device identifier.

Route protocol module B 1838 receives stream protocol packets from stream protocol module 1834 and generates route protocol packets. Route protocol module B 1840 includes a routing decision module 1840. Routing decision module decides whether to communicate a route protocol packet generated from a received stream protocol packet over an airlink to an access terminal or over a link, e.g., a backhaul link, to another access node assembly, e.g., to an IRTP module of another access node assembly.

An exemplary flow of a non-tunneled path case will now be described. Application module B 1822 generates application B packet 1844. Application module B 1822 is associated with RLP B1 module 1828 and communicates the application B packet 1844 to RLP module B1 1828 which generates RLP packet 1846. RLP B1 module 1828 communicates the RLP packet 1846 to stream protocol module 1834 which generates a stream protocol packet including the RLP packet as a payload. The stream header module 1836 generates a stream protocol header to correspond to the payload which identifies the source as the stream from RLP module B1 1828, which is associated with application module B 1822 of ANA 1800. The generated stream protocol packet 1848 is communicated to route protocol module B 1838 which generates route protocol packet 1850 from the received stream protocol packet 1848. Routing decision module 1840 determines that the access terminal which is the intended recipient is currently being served by access node assembly 1800, and therefore, determines to route the route protocol packet 1850 to PCP/MAC/PHY module B 1842. PCP/MAC/PHY module B 1842 processes the received route protocol packet 1850 and generates air link signals 1852 which are transmitted via transmitter module 1804 and antenna 1816 over a wireless communication channel to the access terminal.

An exemplary flow of a tunneled path case will now be described. IRTP module B 1824 receives received route protocol packet 1854 which has been communicated via network interface 1808 from another access node assembly. IRTP header generation module 1825 generates a header which identifies the source access node assembly of the received route protocol packet 1854. IRTP module B 1824 generates IRTP packet 1856 including the received route protocol packet 1854 as its payload, and then communicates the generated IRTP packet 1856 to its associated RLP module, RLP module B4 1830. RLP module B4 1830 processes the IRTP packet 1856 and generates RLP packet 1858 which it communicates to stream protocol module B 1834. Stream header module 1834 generates stream protocol packet 1860 conveying the radio link packet 1858. Stream header module 1836 generates a header for the stream protocol packet 1860 which identifies the stream as being a tunneled stream associated with RLP module B4 1830 and IRTP module B 1824. The generated stream protocol packet 1860 is sent to route protocol module B 1838 which generates route protocol packet 1862 from the stream protocol packet 1860. Routing decision module 1840 determines that the access terminal which is the intended recipient is currently being served by access node assembly 1800, and therefore, determines to route the route protocol packet 1862 to PCP/MAC/PHY module B 1842. PCP/MAC/PHY module B 1842 processes the received route protocol packet 1862 and generates air link signals 1864 which are transmitted via transmitter module 1804 and antenna 1816 over a wireless communication channel to the access terminal.

Figure 19:
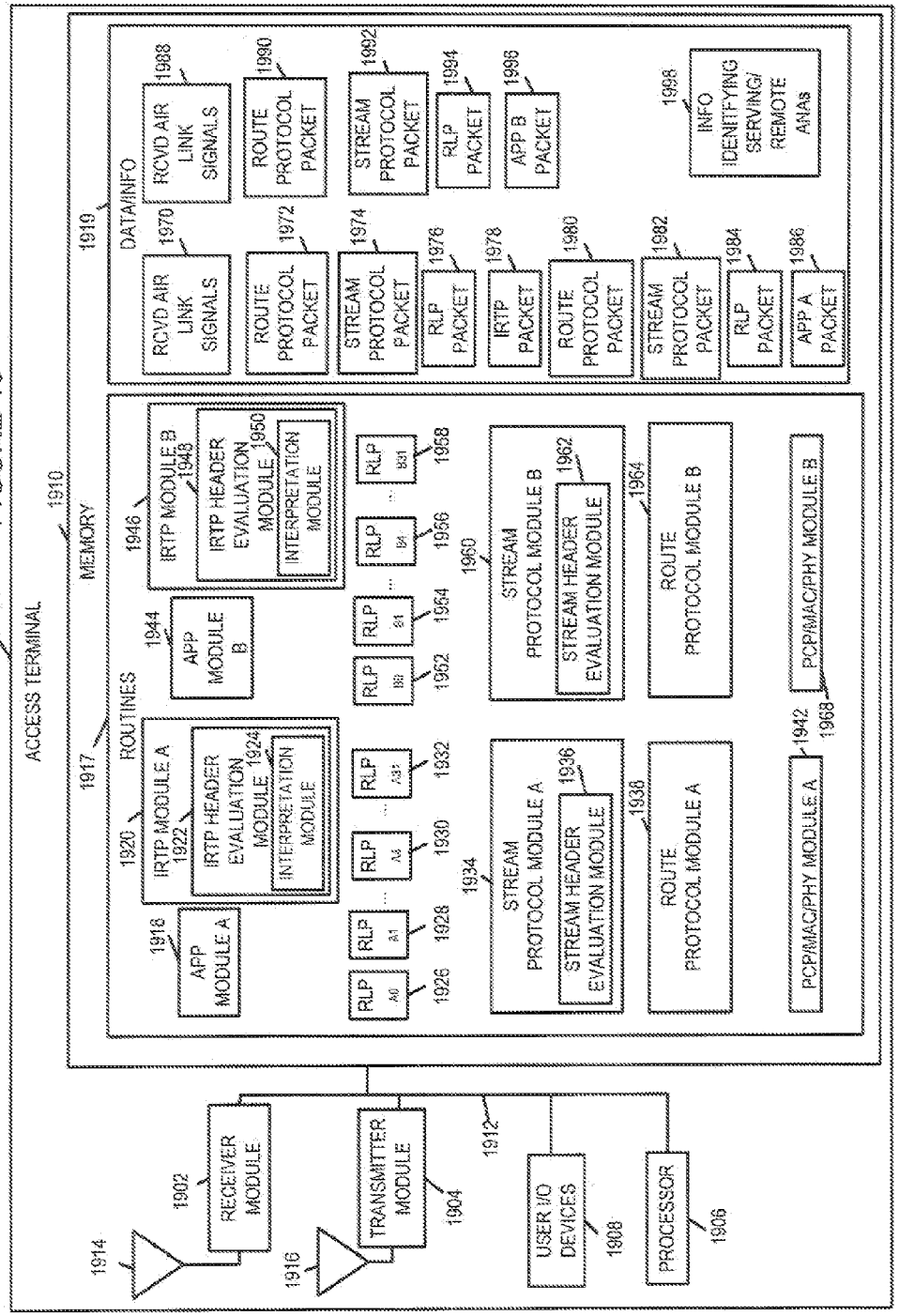
FIG. 19 is a drawing of an exemplary access terminal, e.g., a mobile wireless terminal, in accordance with various embodiments.

FIG. 19 is a drawing of an exemplary access terminal 1900, e.g., a mobile wireless terminal, in accordance with various embodiments. Exemplary access terminal 1900 is, e.g., exemplary access terminal 606 of FIG. 6 with similarly named modules in the two Figures being the same, e.g., Application A module 612 of FIG. 6 is Application module A 1918 of FIG. 19, IRTP A module 614 of FIG. 6 is IRTP module A 1920 of FIG. 19, etc.

Exemplary access terminal 1900 includes a wireless receiver module 1902, a wireless transmitter module 1904, user I/O devices 1908, a processor 1906 and memory 1910 coupled together via a bus 1912 over which the various elements may interchange data and information. Memory 1910 includes routines 1917 and data/information 1919. The processor 1906, e.g., a CPU, executes the routines 1917 and uses the data/information 1919 in memory 1910 to control the operation of the access terminal 1900 and implement methods, e.g., the method of flowchart 1500 of FIG. 15 or a method described with respect to FIG. 6.

Receiver module 1902, e.g., an OFDM wireless receiver, is coupled to receive antenna 1914 via which the access terminal 1900 receives downlink signals from an access node assembly, e.g., from a serving access node assembly. Receiver module 1902 receives signals communicating a packet via an air interface. Transmitter module 1904, e.g., an OFDM wireless transmitter, is coupled to transmit antenna 1916 via which the access terminal 1900 transmits uplink signals to an access node assembly, e.g., to a serving access node assembly. In some embodiments, the same antenna is used for transmitter and receiver. In some embodiments, multiple antennas are used and the access terminal 1900 supports MIMO signaling.

User I/O devices 1908 include, e.g., microphone, keyboard, keypad, switches, camera, speaker, display, etc. User I/O devices 1908 allow a user of access terminal 1900 to input data/information, access output data/information, e.g., for an application, and control at least some functions of the access terminal 1900.

Routines 1917 include one or more application modules including application module A 1918, inter-route tunneling protocol module A 1920, and a plurality of radio link protocol modules (RLP module A0 1926, RLP module A1 1928, . . . , RLP module A4 1930, . . . , RLP module A31 1932), a stream protocol module A 1934, a route protocol module A 1938 and a PCP/MAC/PHY module A 1942. In this example, RLP module A1 1928 corresponds to application module A 1918 and RLP module A4 1930 corresponds to IRTP module A 1920. Consider that application A is associated with a first access node assembly, e.g., access node assembly A. Also consider that ANA A can be, and sometimes is, a remote access node assembly from the perspective of AT 1900.

Routines 1917 also include one or more application modules including application module B 1944, inter-route tunneling protocol module B 1946, and a plurality of radio link protocol modules (RLP module B0 1952, RLP module B1 1954, . . . , RLP module B4 1956, . . . , RLP module B31 1958), a stream protocol module B 1960, a route protocol module B 1964 and a PCP/MAC/PHY module B 1968. In this example, RLP module B1 1954 corresponds to application module B 1944 and RLP module B4 1956 corresponds to IRTP module B 1946. Consider that application B is associated with a second access node assembly, e.g., access node assembly B. Also consider that ANA B can be and sometimes is, a serving access node assembly from the perspective of AT 1900.

Data/information 1919 includes information identifying serving/remote access node assemblies 1998. The designation of an access node assembly as a serving or remote access node from the perspective of access terminal 1900 can change as the access terminal 1900 moves throughout the communications system. Data information 1919 includes information corresponding to a first signaling flow using inter-route tunneling including received air link signals 1970, route protocol packet 1972, stream protocol packet 1974, RLP packet 1976, IRTP packet 1978, route protocol packet 1980, stream protocol packet 1982, RLP packet 1984 and application A packet 1986. The first signaling flow may correspond to tunneled path 694 of FIG. 6. Data information 1919 also includes information corresponding to a second signaling flow which does not use inter-route tunneling including received air link signals 1988, route protocol packet 1990, stream protocol packet 1992, RLP packet 1994 and application B packet 1996. The second signaling flow may correspond to non-tunneled path 692 of FIG. 6.

Inter-route tunneling protocol module A 1920 includes inter-route tunneling protocol header evaluation module 1922. Inter-route tunneling protocol header evaluation module 1922 includes interpretation module 1924.

Inter-route tunneling protocol module B 1946 includes inter-route tunneling protocol header evaluation module 1948. Inter-route tunneling protocol header evaluation module 1948 includes interpretation module 1950.

PCP/MAC/PHY modules (1942, 1968) are coupled to receiver module 1902. Received downlink air link signals from serving access node assemblies are processed by modules (1942, 1968). For example, consider that currently, access terminal 1900 is using access node assembly B as a serving access node assembly and that access node assembly A is currently a remote access node assembly. Access terminal 1900 receives signals via PCP/MAC/PHY module B 1968 which is associated with the serving access node assembly. The received signals are, e.g., received air link signals 1970 which included tunneled information sourced from an application of remote access node assembly A and received air link signals 1988 sourced from an application of serving access node assembly B. PCP/MAC/PHY module B 1968 processes the received air link signals (1970, 1988) and generates route protocol packets (1972, 1990) respectively, which are forwarded to route protocol module B 1964. Route protocol module B 1964 processes received route protocol packets and generates stream protocol packets. For example, route protocol module B 1964 receives route protocol packets (1972, 1990), respectively and generates stream protocol packets (1974, 1992), respectively, which it sends to stream protocol module B 1960 as input. The stream protocol module B 1960 processes the received stream protocol packets. Stream protocol module B 1960 includes stream header evaluation module 1962 which evaluates a received stream header packet header and determines which RLP module in the set of RLP modules (1952, 1954, ..., 1956, ..., 1958) to forward the stream protocol packet payload, which is an RLP packet, to. Stream header evaluation module 1962 determines from a stream protocol packet header included in a stream protocol packet communicated over an air interface, whether to route a radio link protocol packet included in the communicated stream protocol packet to one of a radio link protocol module corresponding to an application and a radio link protocol module corresponding to an inter-route tunneling protocol module. For example, consider that stream protocol packet 1974 includes a stream header which identifies the stream to be a tunneled stream associated with RLP module B4 1956 which corresponds to IRTPB module 1946, e.g., the header includes the value identifying stream 4. Also consider that stream protocol packet 1992 includes a stream header value which identifies the stream to be a non-tunneled stream corresponding to RLP module B1 1954 and application B module 1944, e.g., the header includes the value identifying stream 1. The stream protocol module B 1960 forward the RLP packet included in the stream protocol packet to the identified RLP module.

Consider the example, RLP packet 1994 is forwarded to RLP module B1 1954 which processes the received RLP packet 1994 and uses it to construct an application B packet 1996. Operations of RLP modules may, and sometimes do include de-fragmentation operations, e.g., higher level packet reassembly. Also consider that RLP packet 1976 is forwarded to RLP module B4 1956 which processes the received RLP packet 1976 and generates an inter-route tunneling protocol packet 1978 which it sends to IRTP module B 1946.

IRTP module B 1946 includes an IRTP header evaluation module 1948, which evaluates the IRTP header in the received IRTP packet to determine which route protocol module to forward the route protocol packet included as part of the IRTP packet payload to. IRTP tunneling header evaluation module 1948 determines the route protocol module to which a route protocol packet included as part of an inter-route tunneling protocol packet should be forwarded. The IRTP header evaluation module 1948 includes an interpretation module 1950. Interpretation module 1950 interprets a header value in an IRTP header based on a type value included in a header type value field, said type value indicating that the corresponding header value is one of a route identifier, pilot identifier, access node identifier and predetermined device identifier used to indicate the source of the tunneled packet.

Consider the example, IRTP packet 1978 is processed by IRTP module B 1946 which determines from the header to route recovered route protocol packet 1980 to route protocol module A 1938. Continuing with the example, route protocol module A 1938 process the received route protocol packet 1980 and generates a stream protocol packet 1982 which it forwards to its associated stream protocol module A 1934. Stream protocol module A 1934 includes stream header evaluation module 1936. With regard to tunneled information, stream header evaluation module 1936 determines from a stream protocol packet communicated from stream protocol module B 1960, e.g., stream protocol packet 1982 which was communicated from stream protocol module B 1960 as part of RLP packet 1976, whether to route a radio link packet, e.g., RLP packet 1984, in the communicated stream protocol packet to one of a radio link protocol module corresponding to an application and a radio link protocol module corresponding to an inter-route tunneling protocol module. Stream header evaluation module 1936 receives stream protocol packet 1982 and generates RLP packet 1984. Stream header evaluation module 1936 evaluates the header of received stream protocol packet 1982 and determines that the recovered RLP packet 1984 should be routed to a RLP module associated with an application module rather than an RLP module associated with a IRTP module, e.g., evaluation module 1936 determines from the header value, e.g., from the header value equal to 1, that the intended RLP module for RLP packet 1984 is RLP module A1 1928, which is associated with Application module A 1918. Stream protocol module A 1934 communicates RLP packet 1984 to RLP module A1 1928. RLP module A1 1928 processes the received RLP packet and performs a packet reassembly operation to generate application A packet 1986 which it sends to application A module 1918. In some embodiments, RLP packet assembly operations include de-fragmentation operation.

In some embodiments, an application packet, may, and sometimes does, include information from a plurality of received RLP packets. In some such embodiments, at times, one such RLP packet may be communicated via an air link with a first access node assembly and the RLP packet may have been communicated without using a tunneled path; while another RLP packet may be communicated via an air link interface with a second access node assembly and that RLP packet may have been communicated using a tunneled path. For example, the access terminal has changed its point of network attachment during communication of the application packet.

During the use of the methods and apparatus of the present invention, in some embodiments an application packet stream being directed to a first access node assembly will be subject to RLP In various embodiments, nodes described herein are implemented using one or more modules to perform the steps corresponding to one or more methods of the aspect, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, the aspect is directed to a machine-readable medium including machine executable instructions for causing a machine, e.g., processor and associated hardware, to perform one or more of the steps of the above-described method(s).

In various embodiments nodes described herein are implemented using one or more modules to perform the steps corresponding to one or more methods, for example, signal processing, message generation and/or transmission steps. Some exemplary steps include generating a stream protocol packet, communicated a generated packet over an air interface, operating an inter-route tunneling protocol module etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as access terminals and/or access node assemblies, are configured to perform the steps of the methods described as being performed by the communications device. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a first access node assembly, the method comprising:

generating a data packet;

selecting out of a plurality of radio link protocol modules of the first access node assembly a first radio link protocol module associated with an application of the first access node assembly if said data packet was generated by said application or a second radio link protocol module associated with an inter-route tunneling protocol module of the first access node assembly if said data packet was generated by said inter-route tunneling protocol module;

processing by the selected radio link protocol module the data packet to generate a RLP packet;

sending the generated radio link protocol packet to a stream protocol packet means configured to generate a stream protocol packet including a stream protocol packet header including a value identifying the radio link protocol packet to be communicated to an access terminal, in a payload of said stream protocol packet, as one of a tunneled radio link protocol packet if said radio link protocol packet was generated by the second radio link protocol module associated with the inter-route tunneling protocol module and a non-tunneled radio link protocol packet if said radio link protocol packet was generated by the first radio link protocol module associated with the application; and communicating the generated stream protocol packet over an air interface to said access terminal.

2. The method of claim 1, further comprising:

operating the inter-route tunneling protocol module to receive a route protocol packet communicated from a second access node assembly and to generate an inter-route protocol tunneling header corresponding to a second access node assembly.

3. The method of claim 2, wherein said inter-route tunneling protocol header includes a header type value field indicating one of a route identifier, pilot identifier, access node identifier and predefined device identifier.

4. The method of claim 3, further comprising:
supplying the generated inter-route tunneling protocol header and a payload of said received route protocol packet to the second radio link protocol module corresponding to the inter-route tunneling protocol module.

5. The method of claim 4 further comprising:
operating the second radio link protocol module corresponding to the inter-route tunneling protocol module to generate said radio link protocol packet, said radio link protocol packet including i) an embedded radio link protocol packet generated by said second access node assembly and ii) the generated inter-route tunneling protocol header.

6. A first access node assembly, comprising:
an application module;
an inter-route tunneling protocol module;
a first radio link protocol module associated with the application module and configured to generate a radio link protocol packed from data received from the application module;
a second radio link protocol module associated with the inter-route tunneling protocol module and configured to generate a radio link protocol packet from data received from the inter-route tunneling protocol module;
a stream protocol packet generation module coupled to the first and second radio link protocol modules for generating a stream protocol packet including a stream protocol packet header including a value identifying a radio link protocol packet to be communicated to an access terminal, in a payload of said stream protocol packet, as one of a tunneled radio link protocol packet if said radio link protocol packet was generated by the second radio link protocol module associated with the inter-route tunneling protocol module and a non-tunneled radio link protocol packet if said radio link protocol packet was generated by the first radio link protocol module associated with the application module; and
a wireless transmitter module for transmitting signals conveying the generated packet over an air interface to said access terminal.

7. The first access node assembly of claim 6,
wherein said inter-route protocol module including an inter-route protocol tunnel header generation module for generating an inter-route protocol tunneling header corresponding to a second access node assembly.

8. The first access node assembly of claim 7, wherein said inter-route tunneling protocol header includes a header type value field indicating one of a route identifier, pilot identifier, access node identifier and predefined device identifier.

9. The first access node assembly of claim 8, further comprising:
a route protocol module for receiving stream protocol packets from said stream protocol module.

10. The first access node assembly of claim 9, wherein said route protocol module includes a routing decision module for deciding whether to communicate a route protocol packet generated from a received stream protocol packet over an airlink to an access terminal or a link to another access node assembly.

11. A first access node assembly, comprising:
an application means;
an inter-route tunneling protocol means;
a first radio link protocol means associated with the application means and configured to generate a radio link protocol packed from data received from the application means;
a second radio link protocol means associated with the IRTP means and configured to generate a radio link protocol packet from data received from the IRTP module;
stream protocol packet means coupled to the first and second radio link protocol modules for generating a stream protocol packet including a stream protocol packet header including a value identifying a radio link protocol packet to be communicated to an access terminal, in a payload of said stream protocol packet, as one of a tunneled radio link protocol packet if said radio link protocol packet was generated by the second radio link protocol module associated with the IRTP module and a non-tunneled radio link protocol packet if said radio link protocol packet was generated by the first radio link protocol module associated with the application module; and
means for transmitting signals conveying the generated stream protocol packet over an air interface to said access terminal.

12. The first access node assembly of claim 11,
wherein said inter-route tunneling protocol means including inter-route protocol tunnel header means for generating an inter-route protocol tunneling header corresponding to a second access node assembly.

13. The first access node assembly of claim 12, wherein said inter-route tunneling protocol header includes a header type value field indicating one of a route identifier, pilot identifier, access node identifier and predefined device identifier.

14. The first access node assembly of claim 13, further comprising:
means for receiving stream protocol packets from said stream protocol module.

15. A non-transitory computer readable medium embodying machine executable instructions for controlling a first access node assembly to implement a method of communicating with another communications device, the method comprising:
generating a data packet;
selecting out of a plurality of radio link protocol modules of the first access node assembly a first radio link protocol module associated with an application of the first access node assembly if said data packet was generated by said application or a second radio link protocol module associated with an inter-route tunneling protocol module of the first access node assembly if said data packet was generated by said inter-route tunneling protocol module;
processing by the selected module the data packet to generate a radio link protocol packet;
sending the generated radio link protocol packet to a stream protocol packet means configured to generate a stream protocol packet including a stream protocol packet header including a value identifying a radio link protocol packet to be communicated to access terminal, in a payload of said stream protocol packet, as one of a tunneled radio link protocol packet if said radio link protocol packet was generated by the second radio link protocol module associated with the inter-route tunneling protocol module and a non-tunneled radio link protocol packet if said radio link protocol packet was generated by the first RLP module associated with the application module; and communicating the generated stream protocol packet over an air interface to said access terminal.

16. The non-transitory computer readable medium of claim 15, further embodying machine executable instructions for:

operating the inter-route tunneling protocol module to receive a route protocol packet communicated from a second access node assembly and to generate an inter-route protocol tunneling header corresponding to said second access node assembly.

17. The non-transitory computer readable medium of claim 16, wherein said inter-route tunneling protocol header includes a header type value field indicating one of a route identifier, pilot identifier, access node identifier and predefined device identifier.

18. The non-transitory computer readable medium of claim 17, further embodying machine executable instructions for:

supplying the generated inter-route tunneling protocol header and a payload of said received route protocol packet to the second radio link protocol module corresponding to the inter-route tunneling protocol module.

19. An apparatus comprising:

a processor for use in a first access node assembly, the processor configured to:

generate a data packet;

select out of a plurality of radio link protocol modules of the first access node assembly a first radio link protocol module associated with an application of the first access node assembly if said data packet was generated by said application or a second radio link protocol module associated with an inter-route tunneling protocol module of the first access node assembly if said data packet was generated by said inter-route tunneling protocol module;

process by the selected radio link protocol module the data packet to generate a radio link protocol packet;

send the generated radio link protocol packet to a stream protocol packet means configured to generate a stream protocol packet including a stream protocol packet header including a value identifying a radio link protocol packet to be communicated to an access terminal, in a payload of said stream protocol packet, as one of a tunneled radio link protocol packet if said radio link protocol packet was generated by the second radio link protocol inter-route tunneling protocol and a non-tunneled radio link protocol packet if said radio link protocol packet was generated by the first radio link protocol module associated with the application module; and communicate the generated stream protocol packet over an air interface to said access terminal.

20. The apparatus of claim 19, wherein the processor is further configured to:

operate the inter-route tunneling protocol module to receive a route protocol packet communicated from a second access node assembly and to generate an inter-route protocol tunneling header corresponding to said second access node assembly.

21. The apparatus of claim 20, wherein said inter-route tunneling protocol header includes a header type value field indicating one of a route identifier, pilot identifier, access node identifier and predefined device identifier.

22. The apparatus of claim 21, wherein said processor is further configured to:

supply the generated inter-route tunneling protocol header and a payload of said received route protocol packet to the second radio link protocol module corresponding to the inter-route tunneling protocol module.

* * * * *